United States Patent
Stamoulis et al.

(10) Patent No.: US 8,427,967 B2
(45) Date of Patent: *Apr. 23, 2013

(54) METHOD AND APPARATUS FOR CARRIER IDENTITY DETERMINATION IN MULTI-CARRIER COMMUNICATION SYSTEMS

(75) Inventors: Anastasios Stamoulis, San Diego, CA (US); Rajarshi Gupta, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/108,405

(22) Filed: Apr. 23, 2008

(65) Prior Publication Data

US 2009/0257358 A1 Oct. 15, 2009

Related U.S. Application Data

(60) Provisional application No. 61/045,217, filed on Apr. 15, 2008.

(51) Int. Cl.
*H04L 12/26* (2006.01)
(52) U.S. Cl.
USPC .......................................... 370/252
(58) Field of Classification Search .................. None
See application file for complete search history.

(56) References Cited

U.S. PATENT DOCUMENTS

| | | | |
|---|---|---|---|
| 5,448,750 A | 9/1995 | Eriksson et al. | |
| 6,141,565 A | 10/2000 | Feuerstein et al. | |
| 6,359,901 B1 * | 3/2002 | Todd et al. | 370/465 |
| 7,248,889 B2 | 7/2007 | Schwarz et al. | |
| 7,369,858 B2 | 5/2008 | Backes et al. | |
| 7,660,282 B2 | 2/2010 | Sarkar | |
| 7,668,518 B2 | 2/2010 | Chen | |
| 2005/0083838 A1 | 4/2005 | Kandala | |
| 2005/0111429 A1 | 5/2005 | Kim et al. | |

(Continued)

FOREIGN PATENT DOCUMENTS

| | | |
|---|---|---|
| EP | 1217852 A1 | 6/2002 |
| EP | 1750405 A1 | 2/2007 |

(Continued)

OTHER PUBLICATIONS

International Search Report and Written Opinion—PCT/US08/061472, International Search Authority—European Patent Office—Mar. 13, 2009.

(Continued)

*Primary Examiner* — Kevin C Harper
*Assistant Examiner* — Rhonda Murphy
(74) *Attorney, Agent, or Firm* — Nicholas J. Pauley; Sam Talpalatsky; Joseph Agusta

(57) ABSTRACT

Systems and methods are described that facilitate the determination and request of resources a node may wish to reserve. The resources include a plurality of carriers that are shared with other nodes. In an approach, the node determines a condition related to the plurality of carriers; creates an ordering of the plurality of resources; and transmits a resource utilization message (RUM) for one or more of the plurality of resources based on the ordering and the condition.

38 Claims, 19 Drawing Sheets

U.S. PATENT DOCUMENTS

| | | |
|---|---|---|
| 2007/0004423 A1 | 1/2007 | Gerlach et al. |
| 2007/0104215 A1 | 5/2007 | Wang et al. |
| 2007/0105573 A1 | 5/2007 | Gupta et al. |
| 2007/0105576 A1 | 5/2007 | Gupta et al. |
| 2008/0025230 A1* | 1/2008 | Patel et al. .................... 370/252 |
| 2008/0085719 A1* | 4/2008 | Kuchibhotla et al. ....... 455/452.1 |
| 2008/0144493 A1* | 6/2008 | Yeh ............................... 370/230 |
| 2008/0151926 A1* | 6/2008 | Mosko et al. ................. 370/447 |
| 2008/0165679 A1* | 7/2008 | Anderson et al. ............. 370/230 |
| 2008/0225785 A1* | 9/2008 | Wang et al. ................... 370/329 |
| 2008/0242332 A1 | 10/2008 | Suh et al. |
| 2008/0291830 A1* | 11/2008 | Pernu et al. ................... 370/236 |
| 2009/0054002 A1* | 2/2009 | Urushihara et al. ....... 455/67.13 |
| 2009/0257405 A1 | 10/2009 | Stamoulis et al. |
| 2009/0323598 A1 | 12/2009 | Stamoulis et al. |
| 2010/0020760 A1 | 1/2010 | Grandblaise et al. |
| 2012/0188875 A1 | 7/2012 | Stamoulis et al. |

FOREIGN PATENT DOCUMENTS

| | | |
|---|---|---|
| EP | 1936871 A1 | 6/2008 |
| JP | 2002199435 A | 7/2002 |
| JP | 2006352860 A | 12/2006 |
| JP | 2007267106 A | 10/2007 |
| WO | WO02037692 | 12/2002 |
| WO | WO03092231 A1 | 11/2003 |
| WO | 2007051140 A2 | 5/2007 |
| WO | WO 2007051148 A2 | 5/2007 |
| WO | WO 2009128841 | 10/2009 |

OTHER PUBLICATIONS

Taiwan Search Report—TW097118412—TIPO—Feb. 17, 2012.

* cited by examiner

| SLOT | CM PRIORITY | # OF CHANNELS | RESULTING CM [3][2][1][0] |
|---|---|---|---|
| 1 | 3, 2, 1, 0 | 2 | 1 1 0 0 |
| 2 | 0, 2, 3, 1 | 3 | 1 1 0 1 |
| 3 | 2, 1, 0, 3 | 1 | 0 1 0 0 |
| 4 | 2, 0, 1, 3 | 0 | 0 0 0 0 |

FIG. 9

METHOD AND APPARATUS FOR CARRIER IDENTITY DETERMINATION IN MULTI-CARRIER COMMUNICATION SYSTEMS

CLAIM OF PRIORITY UNDER 35 U.S.C. §119

The present application for patent claims priority to Provisional Application No. 61/045,217 entitled "Method and Apparatus for Carrier Identity Determination in Multi-Carrier Communication Systems" filed Apr. 15, 2008, and assigned to the assignee hereof and hereby expressly incorporated by reference herein.

REFERENCE TO CO-PENDING APPLICATIONS FOR PATENT

The present application for patent is related to the following co-pending U.S. patent applications:

"Method and Apparatus for Carrier Selection in Multi-carrier Communication Systems" having application Ser. No. 12/108,442, filed concurrently herewith, assigned to the assignee hereof, and expressly incorporated by reference herein; and "Method and Apparatus for Resource Utilization Management in a Multi-carrier Communications System" having application Ser. No. 12/108,345, filed concurrently herewith, assigned to the assignee hereof, and expressly incorporated by reference herein.

BACKGROUND

I. Field

The following description relates generally to wireless communications, and more particularly to reducing interference and improving throughput and channel quality in a wireless communication environment.

II. Background

Wireless communication systems have become a prevalent means by which a majority of people worldwide communicate. Wireless communication devices have become smaller and more powerful in order to meet consumer needs and to improve portability and convenience. The increase in processing power in mobile devices such as cellular telephones has led to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. Accordingly, a need in the art exists for systems and/or methodologies that facilitate reducing interference and improving throughput in a wireless communication environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide unified technology for wide and local wireless communication networks in order to facilitate achieving benefits associated with both cellular and Wi-Fi technologies while mitigating drawbacks associated therewith. For instance, cellular networks may be arranged according to a planned deployment, which can increase efficiency when designing or building a network, while Wi-Fi networks are typically deployed in a more convenient, ad hoc manner. Wi-Fi networks may additionally facilitate providing a symmetrical medium access control (MAC) channel for access points and access terminals, as well as backhaul support with in-band wireless capability, which are not provided by cellular systems.

The unified technologies described herein facilitate deploying the network in a flexible manner. The methods described in this disclosure allow the performance to adapt according to the deployment, thus providing good efficiency if the deployment is planned or semi-planned, and providing adequate robustness if the network is unplanned. That is, various aspects described herein permit a network to be deployed using a planned deployment, (e.g., as in a cellular deployment scenario), an ad hoc deployment (e.g., such as may be utilized for a Wi-Fi network deployment), or a combination of the two. Still furthermore, other aspects relate to supporting nodes with varied transmission power levels and achieving inter-cell fairness with regard to resource allocation, which aspects are not adequately supported by Wi-Fi or cellular systems.

For example, according to some aspects, weighted fair-sharing of a set of wireless carriers may be facilitated by joint scheduling of a transmission by both a transmitter and a receiver using a resource utilization message (RUM), whereby a transmitter requests a set of resources based on knowledge of availability in its neighborhood, and a receiver grants a subset of the requested carriers based on knowledge of availability in its neighborhood. The transmitter learns of availability based on listening to receivers in its vicinity and the receiver learns of potential interference by listening to transmitters in its vicinity. According to related aspects, RUMs may be weighted to indicate not only that a node receiving data transmissions up to is disadvantaged (due to the interference it sees while receiving) and desires a collision avoidance mode of transmission, but also the degree to which the node is disadvantaged. An RUM-receiving node may utilize the fact that it has received an RUM, as well as the weight thereof, to determine an appropriate response. As an example, such an advertisement of weights enables collision avoidance in a fair manner. This disclosure describes such a methodology.

According to a related aspect, an RUM sending node may indicate its degree of disadvantage by indicating a number of carriers for which the RUM applies, such that the number of carriers (in general, these could be resources, channels, frequency carriers/sub-carriers and/or time slots) is indicative of the degree of disadvantage. If the degree of disadvantage is reduced in response to the RUM, then the number of carriers for which the RUM is sent may be reduced for a subsequent RUM transmission. If the degree of disadvantage is not reduced, then the number of carriers for which the RUM applies may be increased for a subsequent RUM transmission.

An RUM may be sent at a constant power spectral density (PSD), and a receiving node may employ the received power spectral density and/or received power of the RUM to estimate a radio frequency (RF) channel gain between itself and the RUM sending node to determine whether it will cause interference at the sending node (e.g., above a predetermined acceptable threshold level) if it transmits. Thus, there may be situations wherein an RUM receiving node is able to decode the RUM from the RUM sending node, but determines that the RUM receiving node will not cause interference. When an RUM-receiving node determines that it should obey the RUM, it can do so by choosing to backoff from that resource completely or by choosing to use a sufficiently reduced transmit power bring its estimated potential interference level below the predetermined acceptable threshold level. Thus, "hard" interference avoidance (complete backoff) and "soft" interference avoidance (power control) are both supported in a unified manner. According to a related aspect, the RUM may be employed by the receiving node to determine a channel gain between the receiving node and the RUM-sending node in order to facilitate a determination of whether or not to transmit based on estimated interference caused at the sending node.

The selection of which carriers a node wishes to send in an RUM message is also important. According to an aspect, a method of wireless data communication may include determining a condition related to a plurality of resources; creating an ordering of the plurality of resources; and transmitting an RUM for at least one of the plurality of resources based on the ordering and the condition.

Another aspect relates to an apparatus for wireless data communication, including means for determining a condition related to a plurality of resources; means for creating an ordering of the plurality of resources; and means for transmitting an RUM for at least one of the plurality of resources based on the ordering and the condition.

Another aspect relates to an access point for wireless data communication having an antenna; and a processing system coupled to the antenna. The processing system is configured to determine a condition related to a plurality of resources via the antenna; create an ordering of the plurality of resources; and transmit an RUM for at least one of the plurality of resources based on the ordering and the condition.

Another aspect relates to an access terminal for wireless data communication having a transducer; and a processing system coupled to the transducer. The processing system is configured to determine a condition related to a plurality of resources usable to communicate information usable with the transducer; create an ordering of the plurality of resources; and transmit an RUM for at least one of the plurality of resources based on the ordering and the condition.

Another aspect relates to a computer program product for wireless data communication having a computer-readable medium. The computer-readable medium including code executable to determine a condition related to a plurality of resources; create an ordering of the plurality of resources; and transmit an RUM for at least one of the plurality of resources based on the ordering and the condition.

Another aspect relates to an apparatus for wireless data communication having a processing system. The processing system is configured to determine a condition related to a plurality of resources; create an ordering of the plurality of resources; and transmit an RUM for at least one of the plurality of resources based on the ordering and the condition.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIG. 9 is a diagram for illustrating the operation of the pseudorandom carrier selection process of FIG. 8.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Moreover, references to a list of elements comprising of "at least one of A, B and C" should be interpreted to reference each of the elements A, B and C individually, as well as any combinations of the elements A, B and C. Further, also the description utilizes a network that involves the IEEE 802.11 standard, networks that utilize other protocols may benefit from the various techniques and systems disclosed herein.

It will be understood that a "node," as used herein, may be an access terminal or an access point, and that each node may be a receiving node as well as a transmitting node. For example, each node may comprise at least one receive antenna and associated receiver chain, as well as at least one transmit antenna and associated transmit chain. Moreover, each node may comprise one or more processors to execute software code for performing any and all of the methods and/or protocols described herein, as well as memory for storing data and/or computer-executable instructions associated with the various methods and/or protocols described herein.

Figure 1:
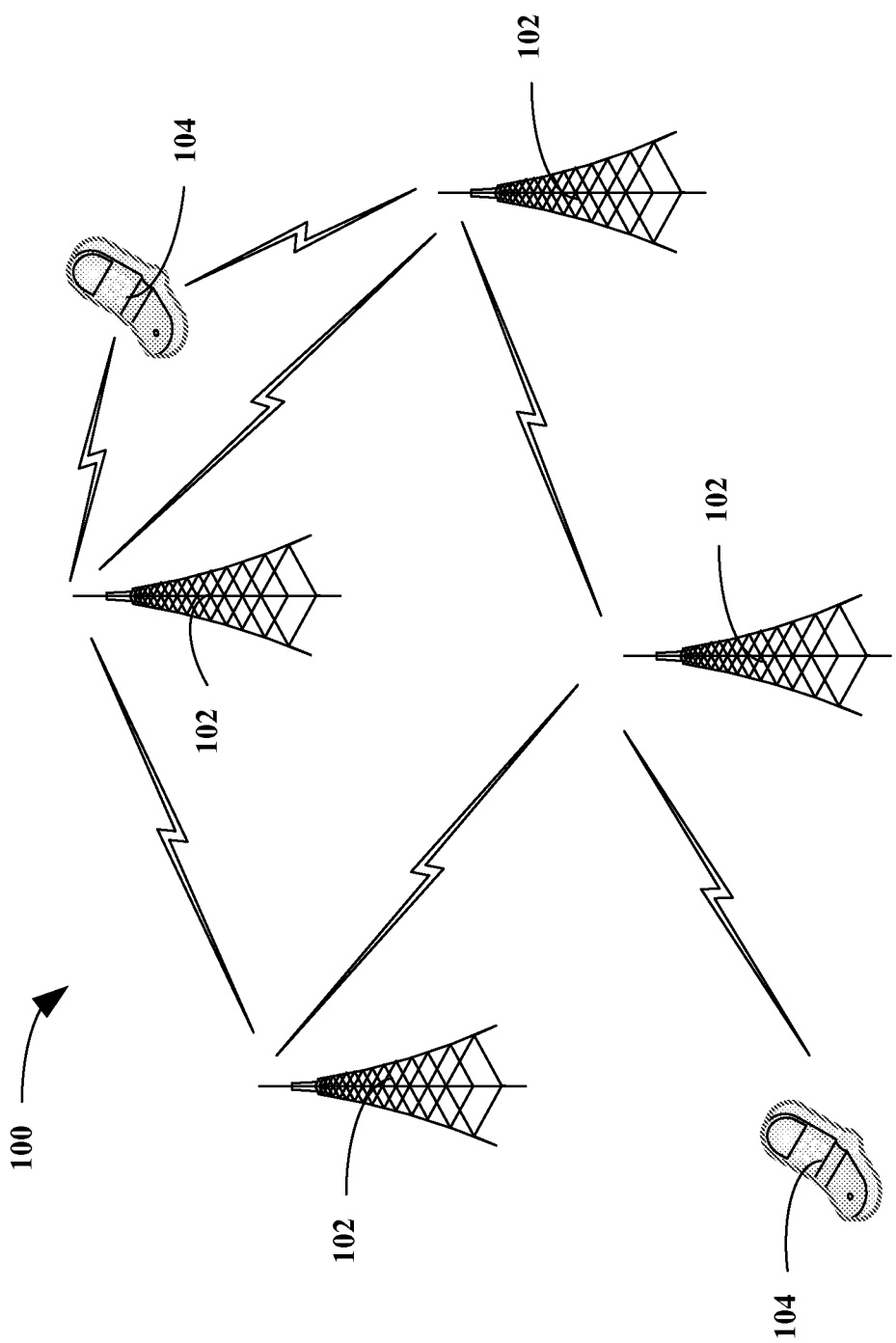
FIG. 1 is a network diagram of an exemplary wireless communication system with multiple access points and multiple access terminals such as may be utilized in conjunction with one or more aspects of a methodology for managing interference by employing a resource utilization message (RUM).

Referring now to FIG. 1, a wireless network communication system 100 is illustrated in accordance with various aspects presented herein. System 100 can comprise a plurality of nodes, such as one or more access points 102 (e.g., cellular, Wi-Fi or ad hoc, etc.), also referred to as base stations, in one or more sectors that receive, transmit, repeat, etc., wireless communication signals to each other and/or to one or more other nodes, such as access terminals 104. As noted, a "node" may be an access terminal or an access point, and may comprise both a receiver and a transmitter. The usage of terminology such as "transmitter" and "receiver" in this description should therefore be interpreted as "when a node plays the role of transmitter" and "when a node plays the role of a receiver" respectively.

Each access point 102 can comprise a transmitter chain and a receiver chain, each of which can in turn comprise a plurality of components associated with signal transmission and reception (e.g. processors, modulators, multiplexers, demodulators, demultiplexers, antennas, etc.), as will be appreciated by one skilled in the art. Access terminals 104 can be, for example, cellular phones, smart phones, laptops, handheld communication devices, handheld computing devices, satellite radios, global positioning systems, PDAs, and/or any other suitable device for communicating over a wireless network.

The following discussion is provided to facilitate understanding of the various systems and/or methodologies described herein. According to various aspects, each node may be assigned a weight, where each weight is a function of a number of flows supported by the node. "Flow," as used herein, represents a transmission coming into or out of a node. The total weight of the node can be determined by summing the weights of all flows passing through the node. For example, in one approach data flows can have be assigned weights proportional to the type of traffic being carried. Thus, HyperText Transport Protocol (HTTP) or File Transfer Protocol (FTP) flows may be assigned a particular weight. Further, constant bit rate (CBR) flows can have predetermined weights proportional to the bit rate. Moreover, each node may be assigned a predetermined static weight that may be added to the flow weight of each node in order to provide extra priority to each node. Weight may also be dynamic and reflect the current conditions of the flows that a node carries. For example, the weight may correspond to the worst throughput of a flow being carried (received) at that node. In essence, the weight represents the degree of disadvantage that the node is experiencing and is used in doing fair channel access amongst a set of interfering nodes contending for a common resource.

Request messages, grant messages, and data transmissions may be power controlled: however, a node may nonetheless experience excessive interference that causes its signal-to-interference noise (SINR) levels to be unacceptable. In order to mitigate undesirably low SINR, resource utilization messages (RUMs) may be utilized. An RUM may be broadcast by a receiver when interference levels on the receiver's desired carriers exceed a predetermined threshold level. As discussed herein, in an aspect of the deployment of RUMs, an RUM is sent out by a receiving node when it is unable to meet its quality of service (QoS) requirements. The QoS requirements may be predetermined and may be expressed in the form of throughput (e.g., for full buffer traffic), latency (e.g., for voice traffic), average spectral efficiency, minimum carrier-to-interference (C/I) ratio, or other suitable metrics. The RUM encapsulates the weight, which signifies the degree of disadvantage faced by the node that is transmitting the RUM. In other words, in an aspect of the use of the weight, the degree of disadvantage is a function of the node's QoS and its desired QoS. This RUM weight may be quantized using a predetermined number of bits.

"Disadvantage," as used herein, may be determined as a function of, for instance, a ratio of a target value to an actual value for a given node. For example, when disadvantage is measured as a function of throughput, spectral efficiency, data rate, or some other parameter where higher values are desirable, then when the node is disadvantaged, the actual value will be relatively lower than the target value. In such cases, a weighted value indicative of the level of disadvantage of the node may be a function of the ratio of the target value to the actual value. In cases where the parameter based upon which disadvantage is based is desired to be low (e.g., latency), a reciprocal of the ratio of the target value to the actual value may be utilized to generate the weight. As used herein, a node that is described as having a "better" condition relative to another node may be understood to have a lesser level of disadvantage (e.g., the node with the better condition has less interference, less latency, a higher data rate, higher throughput, higher spectral efficiency, etc., than another node to which it is compared).

Using RUMs, a receiving node (such as an access point) can block interfering nodes that cause it too much interference. In other words, the receiving node can request other nodes from transmitting on the carrier. In network designs where the bandwidth contains only one carrier, when an RUM is sent by a receiving node, the whole bandwidth is blocked for its intended access terminal. With a multicarrier communication system, in which the available bandwidth is divided into separate portions—each of which is referred to as a carrier or channel; only certain carriers may be blocked so that the receiving node may still achieve its desired throughput while limiting the impact on the rest of the system.

For example, the available bandwidth in a multicarrier communication system may be divided into four (4) carriers. Each transmitting node may then be scheduled to transmit over one (1) or more carriers, thereby allowing better sharing of the resources. In order to ensure that interference avoidance happens in a fair manner—that is, to ensure that all nodes get a fair share of transmission opportunities, the RUM may contain a list of carriers upon which a receiving node desires reduced interference, as well as the aforementioned weight information, as described herein. The weight of a given receiving node can be utilized to calculate the fair share of resources for allocation to the node.

Figure 2:
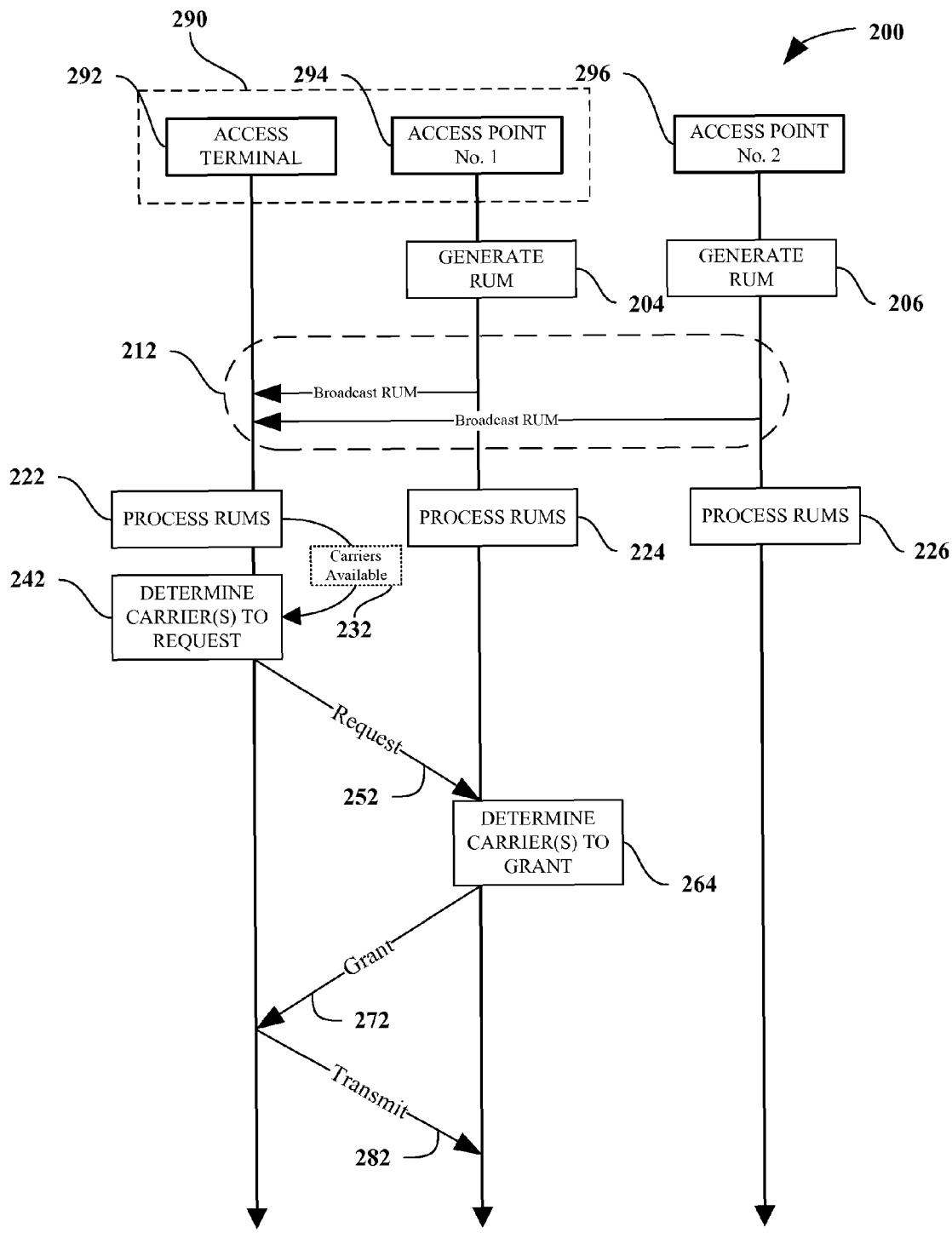
FIG. 2 is a process diagram for a sequence of request-grant events that can facilitate resource allocation, in accordance with one or more aspects described herein.

FIG. 2 illustrates an exemplary request-grant events sequence 200 that involves the use of RUMs to facilitate resource allocation, in accordance with one or more aspects described herein. In the example shown in the figure, an associated pair of nodes 290 includes an access terminal 292 and a first access point 1 294, as well as a second access point 2 296 that is unassociated with the associated pair of nodes 290.

The sequence 200 starts with 204 and 206, during which the access point 1 294 and the access point 2 296 each generates an RUM to be broadcast to other nodes, including access terminal 292. The RUM includes a weight that indicates how disadvantaged the access points are as well as which carriers over which the access point wishes to block other nodes from transmitting, as further described herein with reference to FIG. 3.

In 212, the access point 1 294 and the access point 2 296 broadcasts their respective RUM to other nodes such as access terminal 292.

In 222, the access terminal 292 processes all RUMs received in 212. The RUM processing that is performed by the access terminal 292 is described herein with reference to FIG. 5.

In 232, if the access terminal 292 determines there are carriers available after processing the received RUMs, then it will determine the carriers for which it wishes to send a request to transmit upon from the access point 1 294 in 242.

In 252, a request to transmit is sent from the access terminal 292 to the access point 1 294. The request can include a list of carriers over which the access terminal 292 would like to transmit data. The sequence of events 200 may be performed in view of a plurality of constraints that may be enforced during a communication event. For example, the access terminal 292 may request any carrier(s) that have not been blocked by an RUM in a previous time slot. The requested carriers may be prioritized with a preference for a successful carrier in a most recent transmission cycle.

In 264, the access point 1 294 determines the carriers that it will grant the access terminal 292 to transmit over based on the request received from the access terminal 292. The grant could include all or a subset of the requested carriers. Thus, the grant from the access point 1 294 may be a subset of the carriers listed in the request sent by the access terminal 292. The access point 1 294 can be endowed with authority to avoid carriers exhibiting high interference levels during a most recent transmission.

In 272, the access point 1 294 may then send a grant message to the access terminal 292, which indicates that all or a subset of the requested carriers have been granted.

In 282, the access terminal 292 may then transmit a pilot message to the access point 1 294, upon receipt of which the access point 1 294 may transmit rate information back to the access terminal 292, to facilitate mitigating an undesirably low SINR. Upon receipt of the rate information, the access terminal 292 may proceed with data transmission over the granted carriers and at the indicated transmission rate. Further, when transmitting, the access terminal 292 may send data over the all or a subset of carriers granted in the grant message. The access terminal 292 may reduce transmission power on some or all carriers during its transmission of data.

Figure 3:
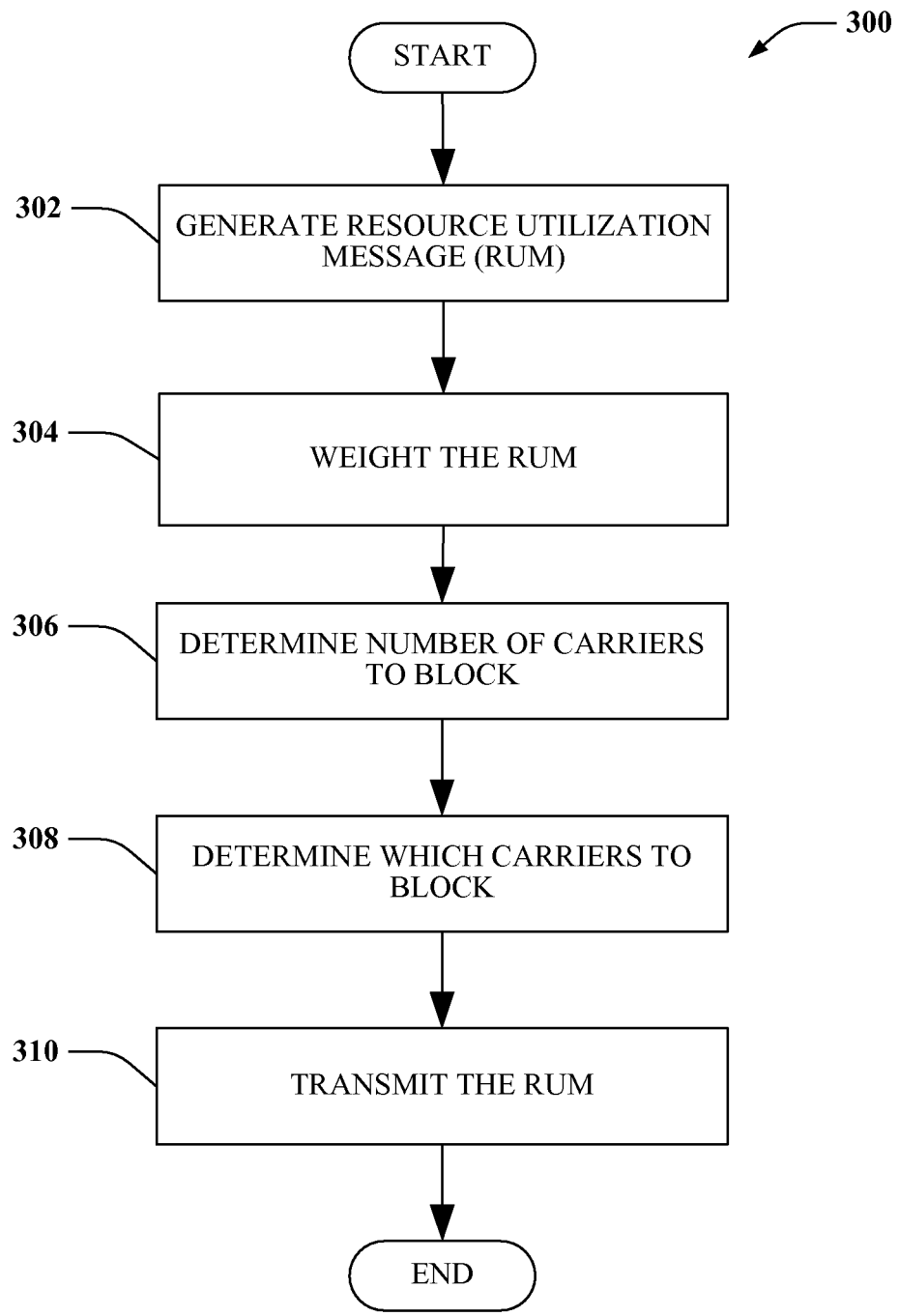
FIG. 3 is a flow diagram of an exemplary methodology for generating an RUM.

FIG. 3 is an illustration of a methodology 300 that for generating an RUM, in accordance with various aspects described above. The methodology for achieving fairness among contending nodes is performed by adjusting a number of carriers for which to transmit an RUM according to a level of disadvantage associated with a given node, in accordance with one or more aspects. As described herein, an RUM is sent out by a receiving node such as an access point to indicate that it is experiencing poor communication conditions and wants a reduction in the interference it faces. The RUM includes a weight that quantifies the degree of disadvantage that the node is experiencing. According to an aspect, the weight may be set as a function of a threshold referred to as the RUM sending threshold (RST). In another aspect, the weight may be set to the average throughput. Here, RST is the average throughput that the node desires. When a transmitting node such as an access terminal hears multiple RUMs, it may utilize respective weights to resolve the contention between them. If, for example, an access terminal receives multiple RUMs and the RUM with the highest weight originated from the access terminal's own access point, then it may decide to transmit a request to send data to its access point. If not, the access terminal may refrain from transmitting.

The RUM allows an access point to clear interference in its immediate neighborhood because the nodes that receive the RUM may be induced to refrain from transmitting. While weights allow for a fair contention (e.g., an access point with the greatest disadvantage wins), having a multi-carrier MAC may provide another degree of freedom. Specifically, when a system supports multiple carriers, the RUM may carry a CM (i.e., bitmask) in addition to the weight. The CM indicates the carriers on which this RUM is applicable. The number of carriers for which an access point may send RUMs may be based on its degree of disadvantage to allow nodes with very poor history to catch up more rapidly. When the RUMs are successful and the transmission rate received by the access point in response thereto improves its condition, the access point may reduce the number of carriers for which it sends RUMs. If, due to heavy congestion, the RUMs do not succeed initially and throughput does not improve, the access point may increase the number of carriers for which it sends RUMs. In a very congested situation, a access point may become highly disadvantaged and may send RUMs for all carriers, thereby degenerating to the single carrier case.

At 302, a level of disadvantage may be determined for an access point and an RUM may be generated to indicate the level of disadvantage to other nodes within "listening" range (i.e., whether they send data to the access point or not), wherein the RUM comprises information that indicates that a first predetermined threshold has been met or exceeded. The first predetermined threshold may represent, for instance, a level of IOT, a data rate, a C/I ratio, a level of throughput, a level of spectral efficiency, a level of latency, or any other suitable measure by which a service at the first node may be measured.

At 304, the RUM may be weighted in order to indicate a degree to which a second predetermined threshold has been exceeded. The second predetermined threshold may represent for instance, a level of IOT noise, a data rate, a C/I ratio, a level of throughput, a level of spectral efficiency, a level of latency, or any other suitable measure by which a level of service at the first node may be measured. According to some aspects, the weight value may be a quantized value. Although the first and second predetermined thresholds may be substantially equal, they need not be.

The weight information carried in each RUM is intended to convey to all nodes within listening range the degree to which the access point has been starved for bandwidth due to interference from other transmissions. The weight may represent a degree of disadvantage and may be larger when the access point has been more disadvantaged and smaller when less disadvantaged. The degree of disadvantage may be derived using a variety of factors. As an example, if throughput is used to measure the degree of disadvantage, then one possible relationship may be represented as:

$$RUM\ Weight = Q\left(\frac{R_{target}}{R_{actual}}\right)$$

where $R_{target}$ represents the desired throughput, $R_{actual}$ is the actual throughput being achieved, and $Q(x)$ represents the quantized value of x. When there is a single flow at the access point, then $R_{target}$ may represent the minimum desired throughput for that flow, and $R_{actual}$ may represent the average throughput that has been achieved for that flow. Note that higher value weights representing a greater degree of disadvantage is a matter of convention. As an example, assuming that a desired throughput for a node is 500 kbps. However, the node only achieves an actual throughput of 250 kbps. In this case, the weight may be calculated based on the node needing twice the current amount of throughput (500 kbps/250 kbps=2) to reach the desired throughput.

In a similar manner, a convention where higher value weights represent lower degree of disadvantage may be utilized as long as the weight resolution logic is appropriately modified. For example, one could use the ratio of actual throughput to target throughput (the inverse of the example shown above) to calculate the weights. Thus, using the above values, the ratio would be 250 kbps/500 kbps, which would be ½, or 50% of the targeted throughput.

When there are multiple flows at the access point, with potentially different $R_{target}$ values, then the access point may choose to set the weight based on the most disadvantaged flow. For example:

$$RUM\ Weight = Q\left(\max_j\left(\frac{R^j_{target}}{R^j_{actual}}\right)\right)$$

where j is the flow index at the access point. Other options, such as basing the weight on the sum of the flow throughput, may be performed as well. Note that the functional forms used for the weights in the above description are purely for illustration. The weight may be calculated in a variety of different manners and using different metrics other than throughputs. According to a related aspect, the access point can determine whether it has data outstanding from a sender (e.g., a transmitter). This is true if it has received a request, or if it has received a prior request that it has not granted. In this case, the access point can send out an RUM when $R_{actual}$ is below $R_{target}$.

Further, the weight may be normalized with respect to a maximum and minimum value. For example, the weight may be normalized to be a value between 0 and 1. The normalized values may be determined based on the received RUM weights, with the highest received RUM weight being set to the value of 1, while the lowest received RUM weight being set to the value of 0.

An additional dimension for collision avoidance can be realized if a list of carriers in the RUM over which the node desires to reduce interference is included along with the weight in an RUM, which may be useful when a receiving node such as an access point needs to schedule the receipt of a small amount of data over a part of the channel and does not want other nodes to back off from the entire channel. The list of carriers may be implemented with a bitmask that contains information about which carriers the access point would like to block. When each RUM is augmented with the bitmask— also referred to herein as a carrier mask (CM), a transmitting node may reduce interference from its neighboring nodes (e.g., access points or access terminals) over a subset of carriers, rather than all the carriers. This aspect may provide finer granularity in the collision avoidance mechanism, which may be important for bursty traffic. Further, the CM may also be used in the generation of requests to transmit by an access terminal in requesting a portion of the channel, as well as the generation of grants to the request by an access point in responding to the requests (e.g., the response may be the grant of a portion of the channel).

Figure 4:
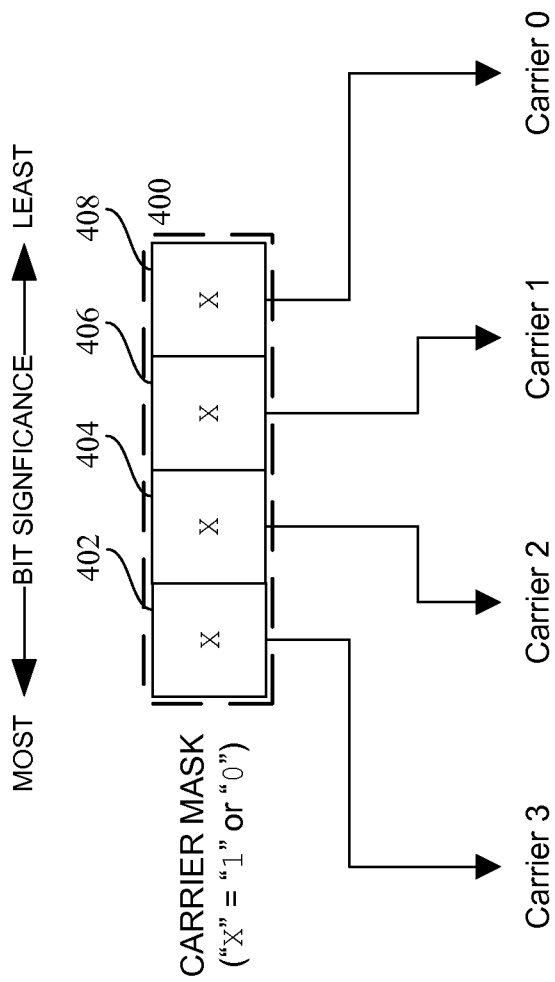
FIG. 4 is a diagram of a carrier mask-to-carrier mapping scheme for use in RUMs in a multi-carrier system, in accordance with one or more aspects.

Referring to FIG. 4, where the bandwidth is being divided into 4 carriers, a CM 400 contained in an RUM will have the form XXXX, where each X is a bitmap that may be a "1", indicating that the carrier to which it refers is blocked, or a "0", indicating that the carrier to which it refers is not blocked. Further, in the described exemplary implementation, where the carriers are numbered "0", "1", "2", "3", a left-most bit 402 in the CM 400 is the bitmask for carrier "3", a second bit 404 located to the right of the left-most bit 402 is the bitmask for carrier "2", a third bit 406 located to the right of the second bit 404 is the bitmask for carrier "1", and a fourth bit 408 located to the right of the third bit 406 is the bitmask for carrier "0". For the aspect in which the whole bandwidth may be blocked by an RUM, the RUM will contain a CM with all "1's" indicating that the access point wants to block every carrier in the bandwidth. Still other aspects provide for employing a CM to indicate a number of carriers allocated to the access point. For instance, a 6-bit mask may be utilized to indicate that RUMs may be sent for up to six carriers. The access point may additionally request that an interfering node refrain from transmitting over all or a subset of the allocated subcarriers.

At 306 and 308, during the creation of the CM to implement partial bandwidth blocking, two of the variables that need to be determined are the number of carriers that should be blocked by the access point as well as the specific identity of the carriers that should be blocked.

In 308, which specific carriers should be blocked are determined. The identity of the carriers that should be blocked based on the number of carriers identified in 306 may be selected randomly from the available number of carriers, or a predetermined selection criteria, including carriers with the most interference or, in the alternative, carriers with the least interference. In an aspect, each carrier may have an associated weight that is transmitted therewith. In this approach, a weight may be generated for each carrier based on the various approaches for determining weights as described herein. Through this manner, even fine granularity may be achieved.

At 310, the weighted and masked RUM may be transmitted to one or more other nodes. As discussed herein, when a node hears the RUM, it needs to obey the RUM only with respect to the carriers specified in the carrier mask. For example, when an access terminal needs to obey multiple RUMs from different access points, it must perform an 'OR' operation on the carriers in all the RUM carrier masks—the complement of this mask indicating the carriers that the access terminal is able to request from an access point. Further, an access point will also consider the RUMs from other access points only with respect to the carriers specified in the carrier mask of each RUM.

Figure 5:
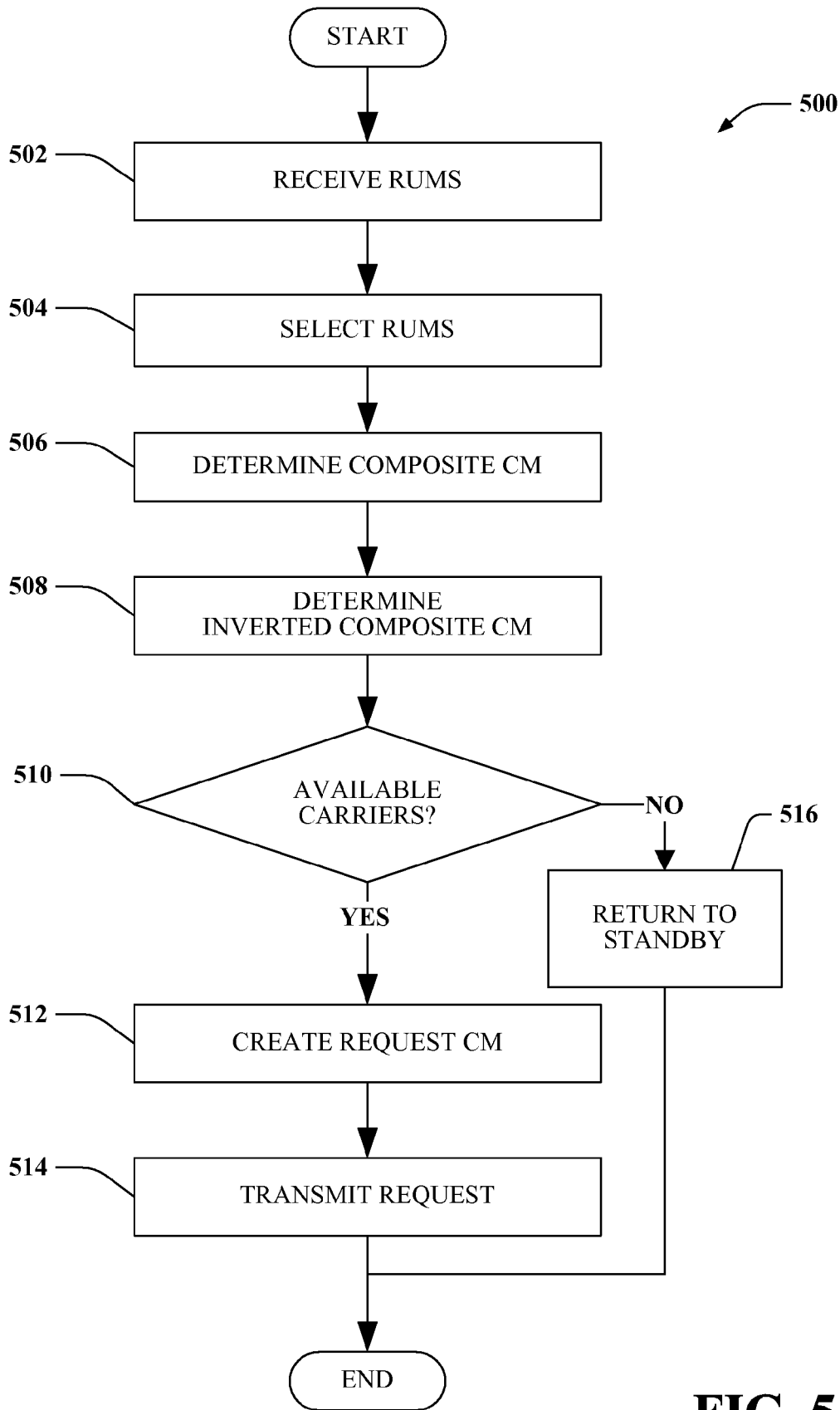
FIG. 5 is an illustration of a methodology for an access terminal in requesting bandwidth from an access point based on received RUMs, in accordance with one or more aspects.
Figure 6:
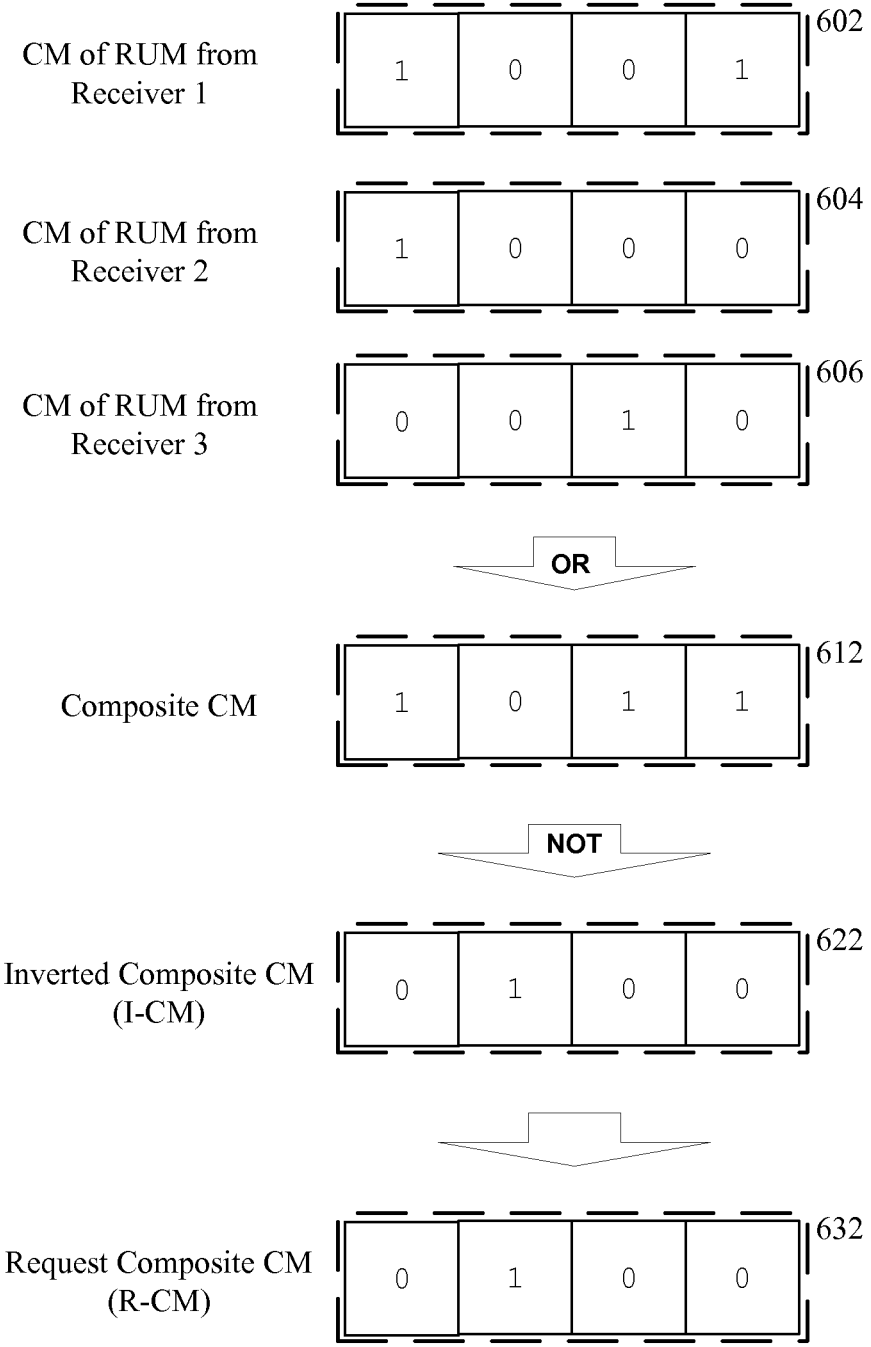
FIG. 6 is an illustration of a sequence of carrier masks created based on one or more received RUMs, in accordance with one or more aspects.

Referring again to FIG. 2, the operation of an access terminal such as access terminal 292 in requesting bandwidth in 222, 232 and 242 is now described with reference to FIG. 5, with reference also being made to FIG. 6. In 502, the access terminal 292 receives and collects the RUMs sent by any access point, including its associated access point 1 294.

In 504, in an aspect of the operation of the access terminal 292, the access terminal 292 considers only those RUMs that have a weight higher than the weight of the access point associated with the access terminal 292 (i.e., access point 1 294) from the received RUMs. Consider the example where the access terminal 292 has received RUMs from three access points in addition to one from access point 1 294, its associated access point—each of these three other RUMs having a weight higher than the weight of the RUM from the access point 1 294. These three RUMs have CMs of CM 602 ("1001"), CM 604 ("1000"), and CM 606 ("0010"), following the exemplary CM form as described in FIG. 4. Further, assume that, based on the weights of the three RUMs, the access terminal 292 must take these RUMs into account. Thus, the access terminal 292 must process the CMs contained in the three RUMs.

In 506, assuming that the access terminal 292 must consider and process the three received RUMs, the access terminal 292 will performs an "OR" operation across the CMs of these RUMs to create a composite CM 612 (i.e., a composite carrier mask). Continuing the above example, the composite CM 612 is "1011". In one aspect, the CM from the associated access point of the access terminal 292 is not utilized.

In 508, to determine if there are any carriers on which the access terminal 292 can request bandwidth, the access terminal 292 performs a "NOT" operation on the composite CM 612 to create an inverted composite CM (I-CM) 622 that will indicate which carriers are available. The I-CM 622 may be used by the access terminal 292 in its request for bandwidth from access point 1 294.

In 510, it is determined if there are carriers over which the access terminal 292 can request bandwidth. In one aspect of the exemplary operation of the access terminal 292, the access terminal 292 will determine if there are any carriers that are not blocked through the use of the I-CM 622. For example, if there is at least a single "1" value in the I-CM 622, then there is at least one carrier available.

In 512, if there are available carriers, the access terminal 292 will create a request CM (R-CM) 632. In one aspect, the R-CM 632 is set to be the I-CM 622 created in 510. Continuing the example above where the bandwidth is divided among four (4) carriers, the R-CM 632 will also have the same form as the CM 400, which is the form "XXXX", where each "X" may be a "1", indicating that the access terminal 292 is requesting to transmit on that carrier, or a "0", indicating that the access terminal 292 is not requesting to transmit on that carrier. Thus, a CM having the value "0100" may be sent in the request to the access point 1 294. In other words, the access terminal 292 will consider carriers "3", "1", and "0" as blocked, with carrier "2" being open. Should the access terminal 292 decide to request bandwidth; the R-CM 632 would be "0100".

Figure 7:
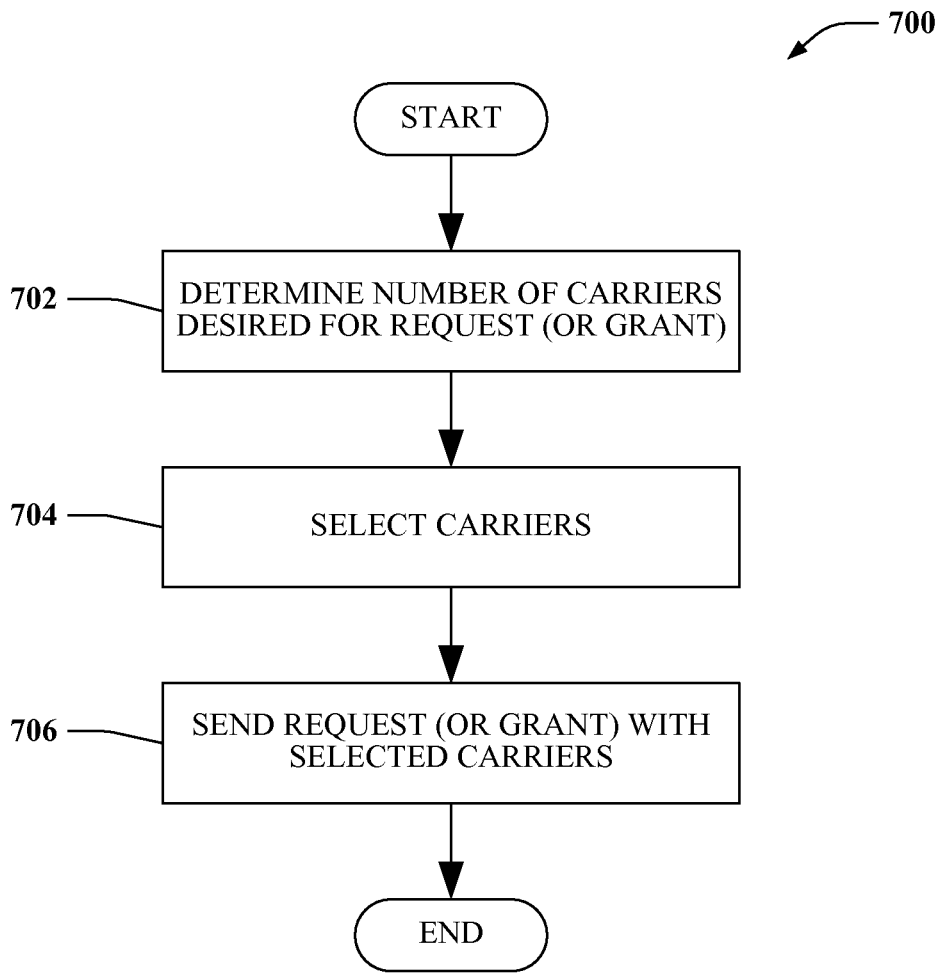
FIG. 7 is an illustration of a methodology for determining the number and selection of carriers to be requested as part of a request to transmit by an access terminal to an access point as well as determining the number and selection of carriers to be granted as part of a grant of the request by the access point to the access terminal.

In another aspect, the R-CM 632 is based on, but not identical to the I-CM 622, as illustrated by FIG. 7, where a process 700 to determine how many carriers to be placed in a request to transmit by the access terminal 292 to the access point 1 294 is illustrated. The figure may also be used to describe the number of carriers that the access point 1 294 will grant the access terminal 292, as further explained herein.

In 702, the access terminal 292 will determine a number of carriers that it will request. This determination may be based on the amount of traffic that the access terminal 292 wishes to transmit. Such determination may also be based on, for instance, need associated with interference experienced at the access terminal, or any other suitable parameter (e.g., latency, data rate, spectral efficiency, etc.)

According to other aspects, if a weight is associated with each node, the determination of the number of carriers desired for a given transmission may be a function of the weight associated with the node, a function of weights associated with other nodes requesting carriers, a function of a number of carriers available for transmission, or any combination of the preceding factors. For example, a weight may be a function of a number of flows through the node, a level of interference experienced at the node, etc. According to other aspects, carrier selection may comprise partitioning carriers into one or more sets, and may be based in part on a received RUM that indicates that one or more carriers in a set of carriers is unavailable. The RUM may be evaluated to determine whether a given carrier is available (e.g. is not identified by the RUM). For example, a determination may be made that a given carrier is available if it is not listed in the RUM. Another example is that a carrier is deemed available even if an RUM was received for that carrier, but the advertised weight for that carrier was lower than the weight advertised in the RUM sent by the node's receiver.

In 704, the access terminal 292 will determine the specific carriers it will request in the R-CM, which may depend on specific carriers designated for particular traffic types or predetermined selection criteria. In one aspect, the carriers that are selected are a function of the available carriers determined in step 510. Carrier selection may also be performed with a preference for available carriers. For instance, carriers that are known to have been available in a preceding transmission period may be selected before carriers that were occupied in the preceding transmission period. It should be noted that the sequence of operations illustrated by 702 and 704 may be reversed or combined in that the total number of carriers that may be requested may be dictated by the carriers available.

For example, if there is only one carrier available for selection, then the sequence of operations illustrated by 702 and 704 may be merged.

In 706, the request will be sent after the R-CM has been constructed. In the above example, the only configuration possible of the R-CM is "0100" as there is only one carrier available. In another example, if all four carriers are available, and the access terminal 292 wishes to transmit over carriers 0, 1 and 3, then a R-CM of "1101" would be created.

In addition to determining the quantity of carriers that needs to be listed in a CM, another consideration is the specific identity of the carriers that ought to be blocked by a node sending out an RUM. In one aspect, each node selects the specific carriers they wish to block using a pseudorandom carrier selection approach, where a mask will be created based on a CM priority list. Specifically, the carriers that are selected for inclusion in the CM are chosen in the order specified in the CM priority list. The CM priority list is randomly created for each slot, or communication period.

Figure 8:
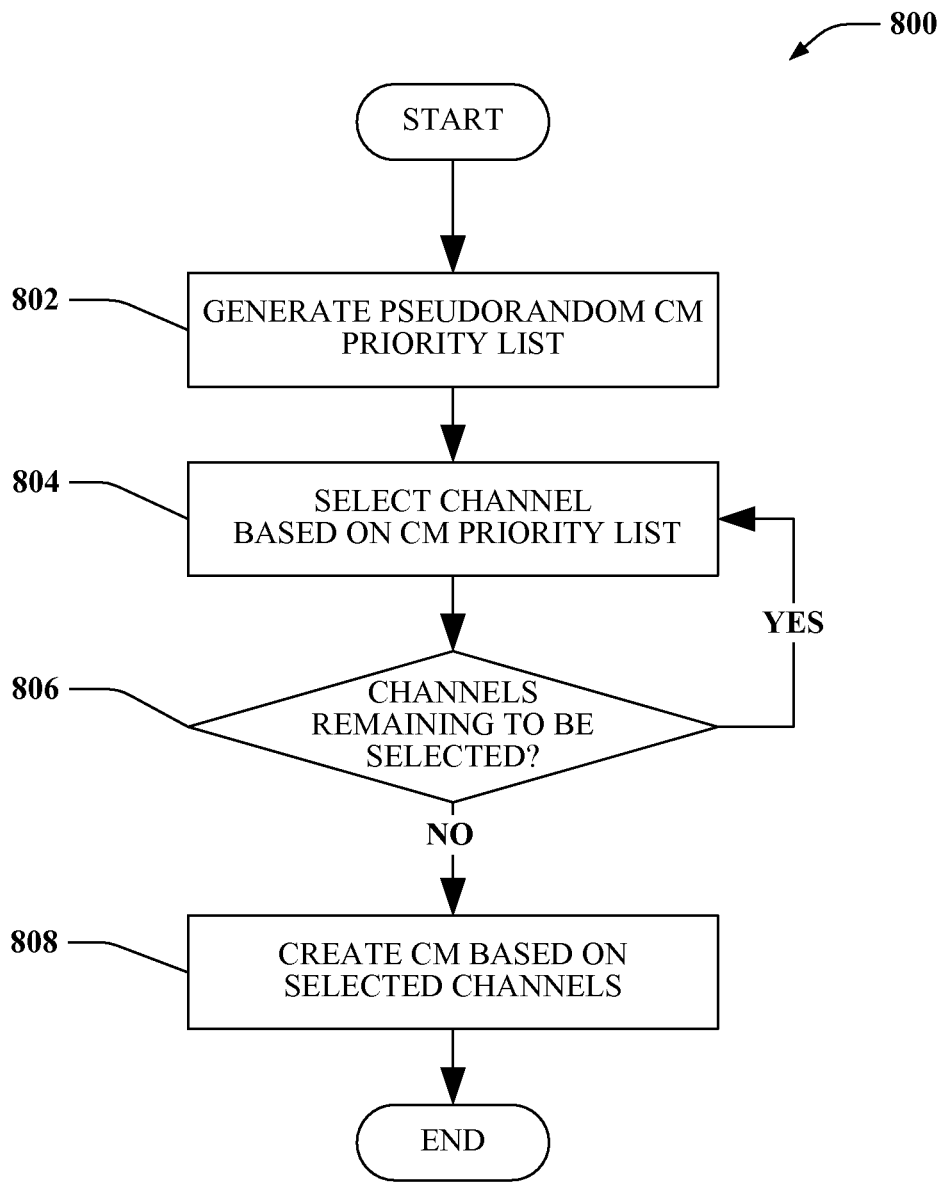
FIG. 8 is a flow diagram illustrating a carrier mask creation process that is based on a pseudorandom carrier mask priority list.

FIG. 8 illustrates the operation of an exemplary pseudorandom carrier selection process 800, where in 802, a CM priority list is randomly created. In 804, a carrier is selected from the CM priority list. Then, it is determined if there are any carriers remaining to be selected in 806. For example, if more than one carrier needs to be selected, and only one carrier has been selected, then the process returns to 804, where another carrier is selected from the CM priority list. If all the carriers that need to be selected have been identified, then operation continues with 808, where a CM is created based on the carriers selected from the CM priority list. Regarding 802, in another aspect of the pseudorandom carrier selection process 800, the CM priority list is generated only if it is determined that at least one carrier is going to be blocked.

FIG. 9 illustrates a table 900 illustrating the masks created with the pseudorandom carrier selection process 800, where a plurality of slots 910 is shown with a plurality of CM priority lists 920, which lists the carriers to be masked with an order of priority; a list of the number of carriers to be blocked 930; and a list of the resulting CMs 940. Four carriers are assumed to be available in the exemplary system, with the listing of the carriers in each CM having a most-significant bit that is the left-most bit, thus, carrier "3" is indicated by the left-most bit in the CM, carrier "2" is the second left-most bit, carrier "1" is the third left-most bit, and carrier "0" is the fourth left-most bit (or right-most bit).

For example, during a slot 1 912, a CM priority list 922 of "3, 2, 1, 0" is listed, which indicates that if only one carrier is to be blocked, then only the first carrier in the list—i.e., carrier "3", will be included in the resultant CM. If two carriers are to be blocked, then the first and second carriers in the list—i.e., carriers "3" and "2", will be included in the resultant CM. If three carriers are to be blocked, then the first, second, and third carriers—i.e., carriers "3", "2" and "1", will be included in the resultant CM. If all four carriers are to be blocked, then carriers "3", "2", "1" and "0" will be included in the resultant CM. As illustrated in FIG. 9, as two carriers are to be blocked (as indicated by a number of carriers to be blocked indicator 932), a resultant CM 942 of "1100" is created.

In a slot 2 914, three carriers are to be blocked, as indicated by a number of carriers to be blocked indicator 934. Given a CM priority list 924 of "0, 2, 3, 1", a resultant CM 944 of "1101" is created because carriers "0", "2", and "3" are selected for the CM. If only two carriers needed to be selected, a resultant CM of "0101" would be created as carriers "0" and "2" would be selected. If only one carrier needed to be selected, a resultant CM of "0001" would be created because carrier "0" would be selected.

In a slot 3 916, one carrier is to be blocked, as indicated by a number of carriers to be blocked indicator 936, and given a CM priority list 926 of "2, 1, 0, 3", a resultant CM 946 of "0100" is created because carrier "2" is selected for the CM.

In a slot 4 918, no carriers are to be blocked, as indicated by a number of carriers to be blocked indicator 938, and a resultant CM 948 of "0000" is created because carrier "2" is selected for the CM.

In another aspect, instead of each node generating a pseudorandom CM priority list for each slot, each node is configured with a fixed, static CM priority list. Using the fixed, static CM priority list, the number of carriers to be blocked is to be selected in the order as specified in the CM priority list. Thus, in order to block one carrier, the first carrier from the fixed CM priority list will be chosen. In order to block two carriers, the first two carriers in this fixed CM priority list will be chosen, and so on. In this scheme, by choosing the carriers to be listed in the resultant CM (i.e., the carriers to be blocked) in a predetermined fashion, frequency reuse may be incorporated. In a first instance, a node would normally be able to use all the frequencies. However, during times of congestion, a node will switch to selecting the number of carriers to be blocked in the order as specified by the node's fixed CM priority list. In one approach, the fixed CM priority list can be transmitted to each node using a wireline connection where the node is wired. For example, where the node is an AP that is wired to the network, the AP can be sent the static CM priority list from a controller.

In another aspect, a resultant CM is created using a CM priority list that is based on measurements of the interference over thermal (IOT) detected for each carrier, where a CM priority list is generated that includes each carriers along with the IOT measured for that carrier. Then, the carriers listed in the CM priority list are sorted in order of the measured IOT from the highest IOT to the lowest. In an approach, the carriers that are blocked in the CM are chosen from the CM priority list in the sorted order, which are the carriers over which the node has been seeing the most interference. In this approach, blocking these carriers will be of most benefit to the node. However, these are also the carriers where the node is likely to affect the largest number of neighboring nodes. In another approach, the carriers are sorted from the smallest IOT to the largest, in that order. Thus, in this other approach, the node will leave aside those carriers where it is facing a lot of contention and, instead, focus on those carriers where it will likely affect the least number of competitors.

Figure 10:
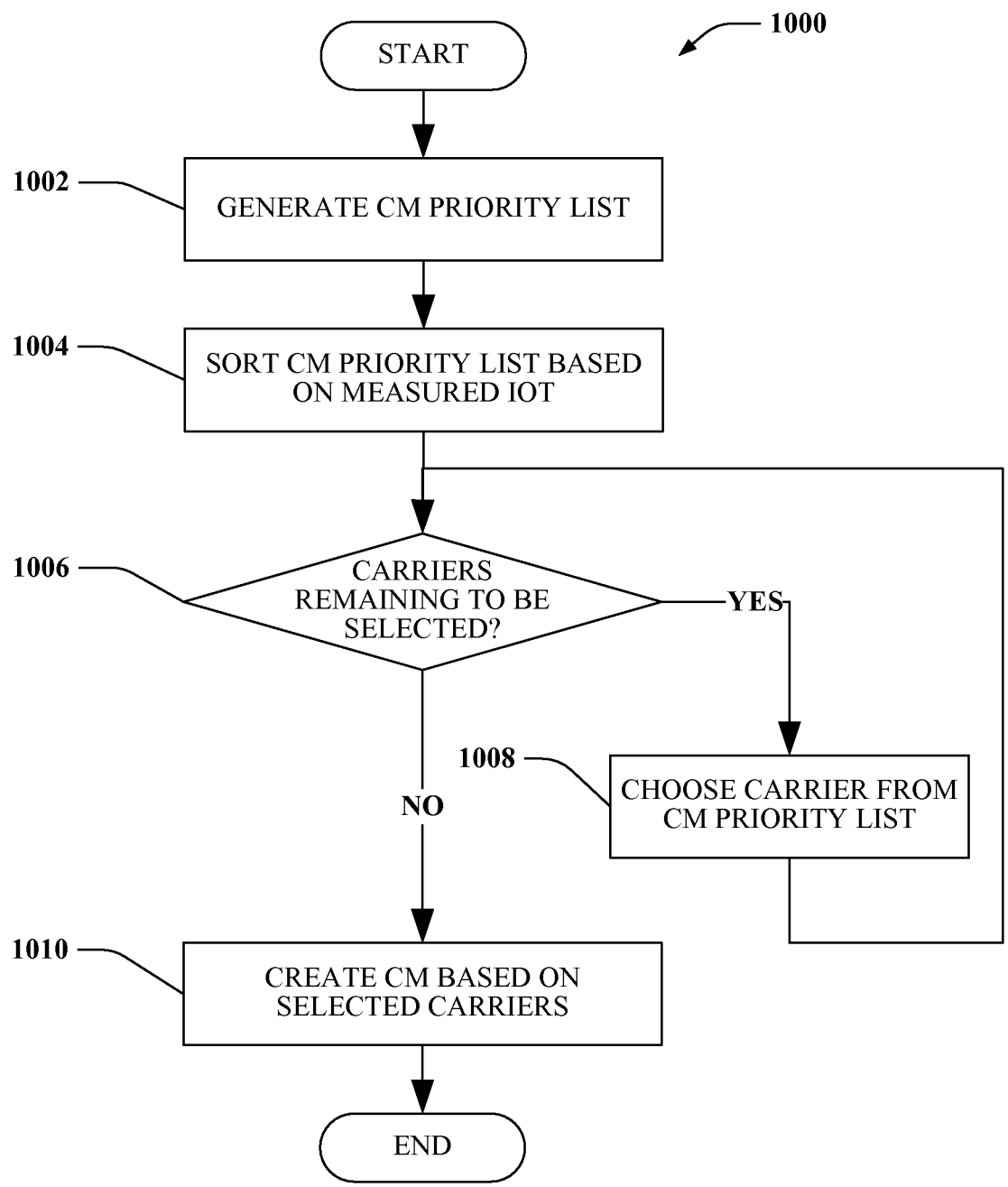
FIG. 10 is a flow diagram illustrating a carrier mask creation process that is based on a carrier mask priority list prioritized using interference over thermal measurements.

FIG. 10 illustrates a CM creation process 1000 where, in 1002, a CM priority list is generated that includes each carrier along with the IOT measured for that carrier. Then, in 1004, the carriers listed in the CM priority list are sorted in order of the measured IOT. In one approach, as discussed above, the carriers that are listed higher in the list are the carriers on which the node estimates that the interfering nodes will cause the most interference. In another approach, the carriers that are listed higher in the list are the carriers on which the node estimates that the interfering nodes will cause the least interference. The carrier(s) to be identified to be included in the CM will be selected from the sorted CM priority list in a predetermined fashion (e.g., top to bottom). For example, consider an exemplary CM priority list of "3", "2", "0" and "1" that is a highest IOT to lowest IOT sorted CM priority list, which means that the node has identified that carrier "3" has the highest IOT and carrier "1" has the lowest IOT, with carriers "2" and "0" being the carriers with the second and third highest IOTs, respectively. If only two of the four carriers need to be blocked, then carriers "3" and "2" will be selected, in that order, based on the example of the node being configured to block the carriers where it detects the highest IOT.

In 1006, it is determined if there are any carriers that need to be identified for inclusion in the CM. In one aspect, this is determined by determining if there has been a sufficient number of carriers identified to equal the number of carriers to be blocked. Continuing with the previous example, if two carriers need to be blocked, but only one of those carriers (e.g., carrier "3") has been identified, then a sufficient number of carriers to be blocked has not been identified.

To continue to identify carriers to be blocked, operation continues with 1008, where a carrier is chosen from the CM priority list. Continuing with the example, where a carrier (i.e., carrier "3") has been identified, carrier "2", which is next in the list below carrier "3", is identified for inclusion in the CM.

If all the carriers that need to be identified to be blocked by the CM has been identified, then the CM is created in 1010. Again, continuing with the example given, if the two carriers ("3" and "2") have been identified for inclusion in the CM based on their position in the CM priority list, then no additional carriers need to be identified and a CM of "1100" (e.g., the CM with carriers "3" and "2" being blocked) is created.

It should be noted that although it is exemplified that the carriers listed higher in the CM priority list are chosen first, other approaches may include one where the carriers listed lower in the CM priority list are chosen first. Thus, the described sort order of the carriers in the CM priority list from highest IOT to lowest IOT or vice versa is used only to illustrate the exemplary approaches for carrier selection and not to be construed strictly as the only way to perform carrier selection. For example, a CM priority list may be sorted from lowest IOT to highest IOT, but the order in which the carriers are selected may start from the bottom of the list.

In another aspect, the carriers that are to be blocked are chosen based on the amount of interference the node estimates will be encountered on the carriers. In an approach, the node will block carriers that it estimates will encounter the most interference. The consideration for this approach is that the node wishes to reduce as much interference on possible on the carriers on which it is experiencing the most interference. In another approach, the node will block carriers that it estimates will encounter the least interference. The consideration for this approach is that the node will be blocking the carriers that the fewest other nodes are transmitting on, thereby causing the least amount of disruption for the other nodes using this carrier.

Figure 11:
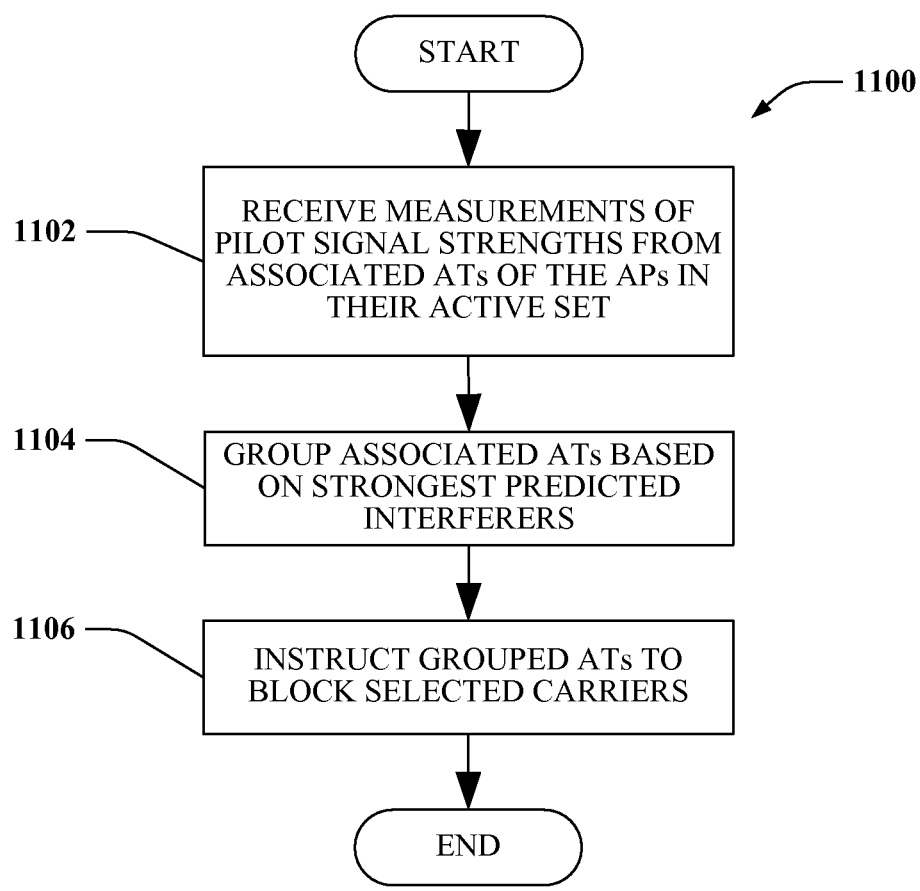
FIG. 11 is a flow diagram illustrating a carrier selection process that is based on an estimate by a node of the carriers on which interfering nodes will cause the least/most interference.

FIG. 11 illustrates a carrier selection process 1100 performed on an AP where, in 1102, the AP receives from each AT associated with the AP measurements by the particular AT of the pilot signal strengths from each of the APs in the active set of the particular AT. For example, where a network includes an AP_0 associated with an AT, the AT will measure the strengths of the pilot signals it receives from all the APs in its active set and report those measurements to AP_0. In an approach, each AT predicts its primary interferer based on a sequence of interference measurements received over many previous slots. Further, each AT can identify its primary interferers because each AP sends its identification information in its RUM message.

In 1104, the ATs are grouped based on the strongest predicted interferers. For example, where AP_0 is associated with a group of ATs, where certain ATs in the group of ATs experiences the strongest interference from an AP_1 and an AP_3, AP_0 could group together all its ATs from which it has received reports of the most interference AP_1 and AP_3.

In one aspect, AP_0 could tag this group of ATs as being "strongly interfered with by {AP_1, AP_3}".

In 1106, the AP will instruct all ATs in each grouping of ATs to block the carriers from those identified APs from which interference has been detected and is predicted to continue (i.e., the predicted primary interferers). In an aspect, the AP will instruct the ATs in the group to request blocking of the carriers not listed in the carrier masks transmitted by the identified APs. In other words, the AP will instruct the ATs in each grouping to block a set of carriers complementary to the set of carriers contained in a union of the carrier masks transmitted by the predicted primary interferers of each respective group. In an aspect, a union carrier mask (U-CM) may be created to list the carriers contained in the union of the carrier masks transmitted by the predicted primary interferers for each group. Further, a complimentary carrier mask (C-CM) may be created for the purpose of listing the carriers that are in the set of carriers complementary to the carriers in the U-CM, and this is the CM that is used by each of the associated ATs as a CM, referred to as a group carrier mask (G-CM). Continuing with the current example, AP_0 will instruct all ATs that belong to the group that is strongly interfered with by {AP_1, AP_3} to block carriers that are in the C-CM that are contained in a U-CM of the carrier masks transmitted by AP_1 and AP_3.

In an aspect, a carrier mask referred to as a group carrier mask (G-CM) is created that contains all the carriers to be blocked by the AP (e.g., AP_0) for its associated ATs. For example, the G-CM in the above example will reflect the C-CM. It should be noted that not all carriers in the C-CM need to be listed in the G-CM. Instead, in another aspect, if the number of carriers the AP (e.g., AP_0) determines need to blocked is less than the number of carriers listed in the C-CM, then the G-CM will only list the carriers that the AP desires to be blocked. In this later aspect, the C-CM may be used as a CM priority list from which the AP will first chose carriers to be blocked.

Figure 12:
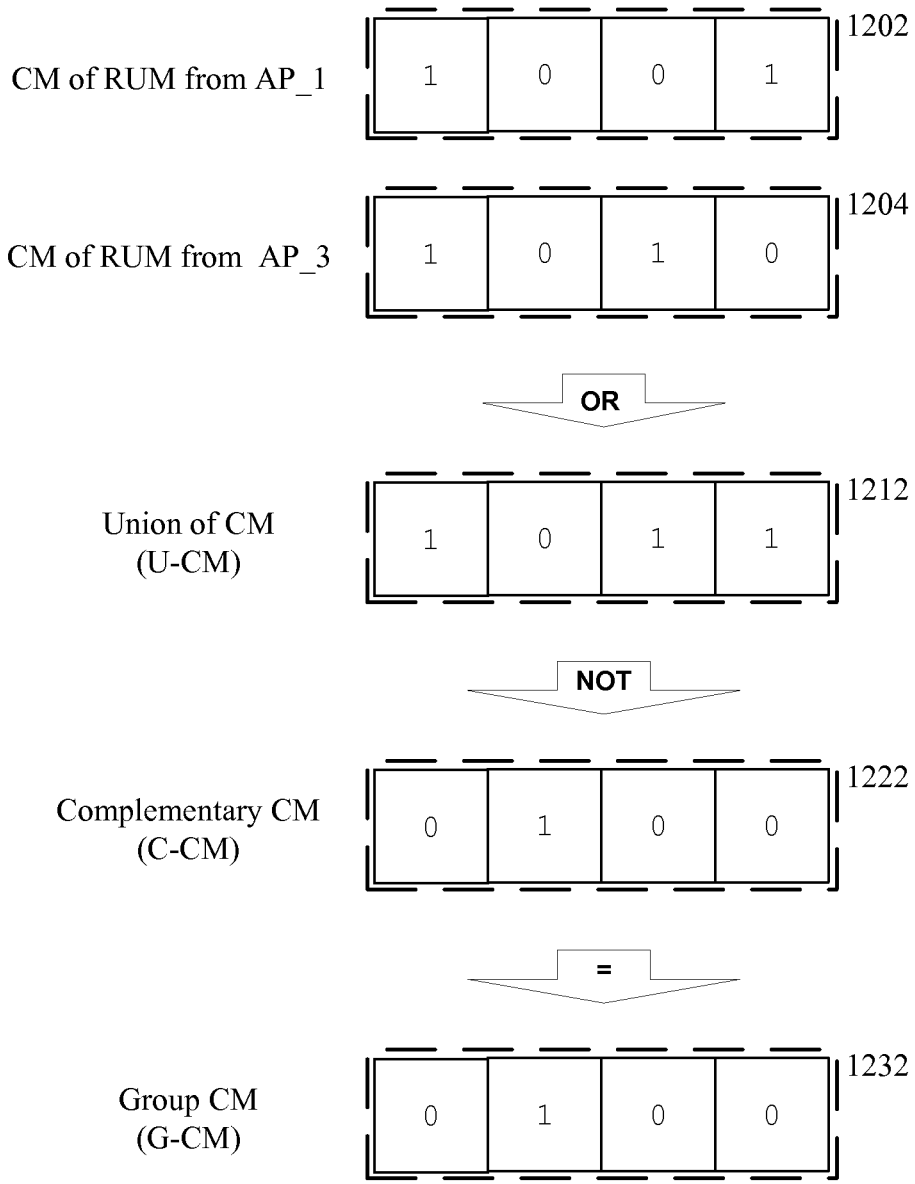
FIG. 12 is a block diagram illustrating the creation of a carrier mask based on the carrier selection process of FIG. 1.

FIG. 12 illustrates a CM created based on the carrier selection process 1100 of FIG. 11, where an AP_1 CM 1202 from an RUM received from AP_1 of "1001" is shown, indicating that AP_1 wishes to block carriers "3" and "0". An AP_3 CM 1204 of an RUM received from AP_3 "1010", indicating that AP_3 wishes to block carriers "3" and "1", is also shown. A union of the AP_1 CM 1202 and the AP_3 CM 1204 produces a U-CM 1212 of "1011", where carriers "3", "1" and "0" are identified as requested to be blocked in the CM by the combination of AP_1 and AP_3, while a C-CM 1222 created by a complement of U-CM results in a listing of carrier "2" as being the only carrier not requested to be blocked by AP_1 and AP_3. A resulting G-CM 1232 is constructed from C-CM 1222, which in the aspect disclosed herein, G-CM 1232 is set to be equal to C-CM 1222.

When a node is going to send out an RUM, it is aware of the characteristics of the flow that is causing this RUM to be sent out. This provides an opportunity to separate traffic classes into separate carriers during times of congestion. Thus, a partitioning scheme may be predetermined, based on a traffic type of the flow.

In an aspect, a node that is sending out an RUM will check its traffic class and determine, based on the traffic class, the carrier(s) on which the RUM will be sent. For example, if the RUM is for a voice flow, it is sent on a predetermined carrier, such as carrier "0". If the RUM is for a data flow, it is sent on other carriers (such as carriers "1" to "n", where there are n carriers in the system). Other priority classes like video traffic may be assigned specific carriers, with data traffic taking up the remainder of the carriers.

Preferably, the choice of carriers is common system-wide. In one aspect, the number of carriers reserved for each traffic class depends on deployment and will be decided upon by the operator. The specific number of carriers reserved for each traffic class may be stored in a partitioning scheme. Predetermined partitioning schemes may be communicated to all nodes in a system using one or more control messages, such as from a network center.

During non-RUM operations, all traffic is free to be scheduled on all carriers. This provides maximum flexibility in scheduling the calls. However, during times of congestion, nodes start sending RUMs in order to acquire one or more relatively interference-free carriers for their transmissions. Typically, these RUMs block other nodes from transmitting on these carriers. By requiring that all voice traffic be limited to sending out RUM on a single carrier (e.g., carrier "0"), that the voice flows will not block the transmission of other traffic on the other carriers. Since voice flows typically have small bandwidth requirement, they should be satisfied on a single carrier. The data calls, which may also be congested, now have the other carriers to use. Had the voice calls been allowed to send RUMs on multiple carriers, they may have blocked data flow on the other carriers altogether—even though the voice traffic only required a small amount of bandwidth. Further, the RUMs with a carrier mask contain high-priority carriers may be transmitted at a higher transmission power.

In another aspect, where the voice RUMs are guaranteed to have higher priority over data RUMs, the data flows may be allowed to send RUMs on the carrier reserved for voice traffic (e.g., carrier "0") as well. This approach expressly addresses the situation where the voice flows are satisfied but the data flows are not. By allowing data flows to send RUMs on the voice carrier, data flows may also occupy this carrier to enhance their service. Although, this may result in some voice calls getting blocked temporarily, if a voice call is blocked enough to cause problems, the node too will send RUMs. However, since the voice RUMs always have higher priority, it will force the data calls to vacate the carrier reserved for voice.

In another aspect, the carriers to be blocked may be randomly selected. Although straightforward in implementation, the results from the use of this approach are predictably unpredictable.

Referring back to FIG. 5, in 514, the access terminal 292 will send a request to the access point 1 294 that will carry the R-CM that lists the carriers over which the access terminal 292 intends to transmit data. The request may be a request for a first plurality of carriers that were not blocked in a most recent time slot, a request for a second plurality of carriers if the first plurality of carriers is insufficient for data transmission. The request message sent at 514 may additionally be power-controlled to ensure a desired level of reliability at the access point 1 294.

In 516, if there are no available carriers, then the access terminal 292 will return to a "standby" mode to await the next RUM message broadcast or any message from the access point 1 294.

Figure 13:
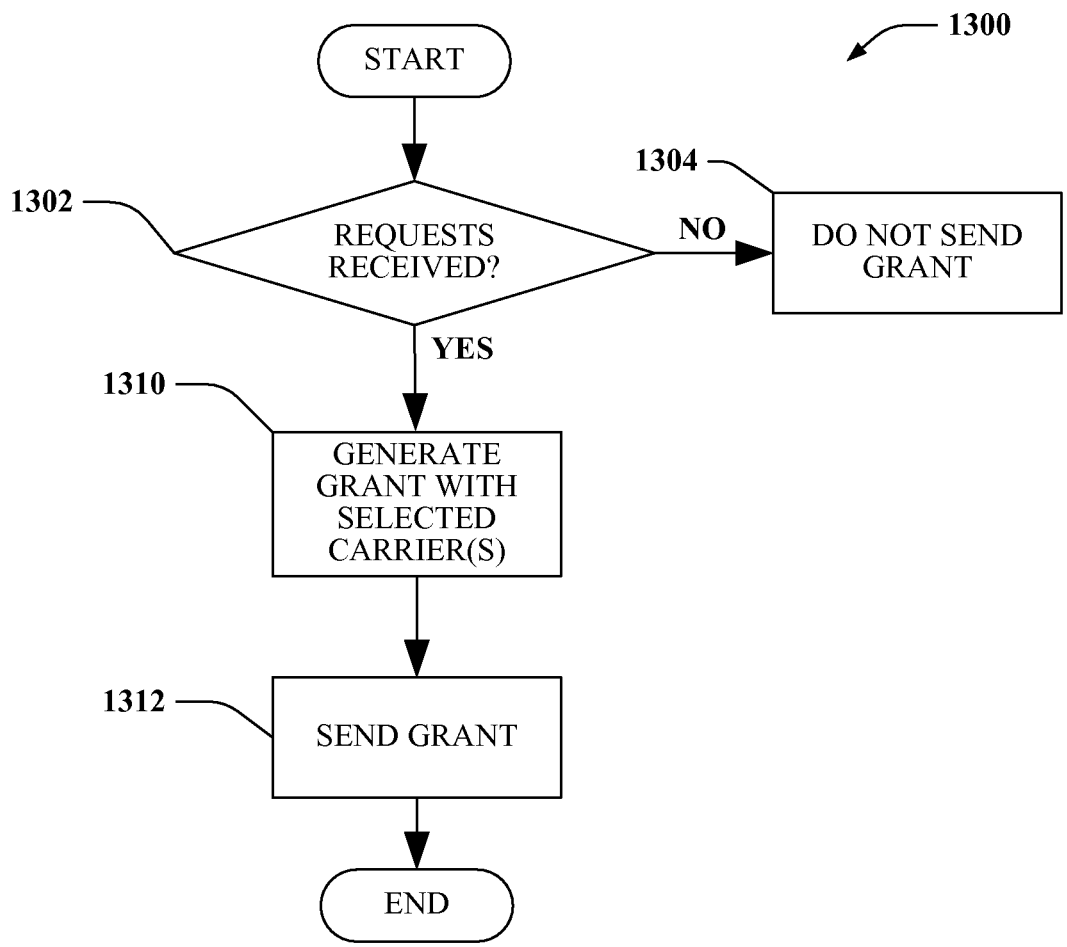
FIG. 13 is an illustration of a methodology for generating a grant for a request to transmit, in accordance with one or more aspects.

FIG. 13 illustrates a methodology 1300 for processing requests, and generating a grant for a request to transmit, such as the access point 1 294 in 264, in accordance with one or more aspects. As discussed, each access terminal (e.g., access terminal 292) that has traffic to send may send a request to their respective access point (e.g., access point 1 294) unless it is blocked by an RUM from another access point. Based on the requests received by the access point 1 294, the access point 1 294 may decide to grant a given request on one or more requested carriers.

In 1302, the access point 1 294 assesses requests. If no requests have been received, then in 1304 the access point 1 294 will refrain from sending a grant message.

If at least one request has been received from an access terminal, then in 1310, the access point 1 294 will determine the number and selection of the carriers it will grant in response to the request. The process illustrated in FIG. 7 as described above with reference to the generation of a request to transmit by an access terminal (e.g., access terminal 292) may also be used to describe the selection of the carriers to be granted in response to the request. In 702, the access point 1 294 will determine the number of carriers it will assign to each access terminal (e.g., access terminal 292) as a part of its process of assigning bandwidth to all the access terminals that it serves from which it has received a request. Then, in 704, the access point access point 1 294 will determine the specific carrier(s), if any, over which it will grant each access terminal (e.g., access terminal 292) permission to transmit.

In an aspect, an access point is limited in its ability to assign carriers in the grant in response to each request from an access terminal. For example, the access point 1 294 may be limited to assigning only the carriers that correspond to the carriers found in the R-CM contained in the previously received request from the access terminal 292. In other words, the access point may assign to a particular access terminal only the carriers found in the group of carriers listed by the CM contained in the previous request (i.e., R-CM) from a particular access terminal.

In 1312, once all possible grants are generated in 1310, then they are sent to their respective requesting access terminals (e.g., the access terminal 292).

According to related aspects, an access point may periodically and/or continuously assess whether it has data outstanding from one or more of the access terminals that it serves. This is true if the access point has received a current request or if it has received a prior request that it has not granted. In either case, the access point may send out a grant when the access point determines that such a grant is warranted. Further, based on a determined grant rate (e.g., whenever the average transmission rate is below a target rate), the access point may send an RUM to reserve more bandwidth for its associated access terminals. Additionally, upon the receipt of the grant, the access terminal may transmit a data frame, which may be received by the access point.

Figure 14:
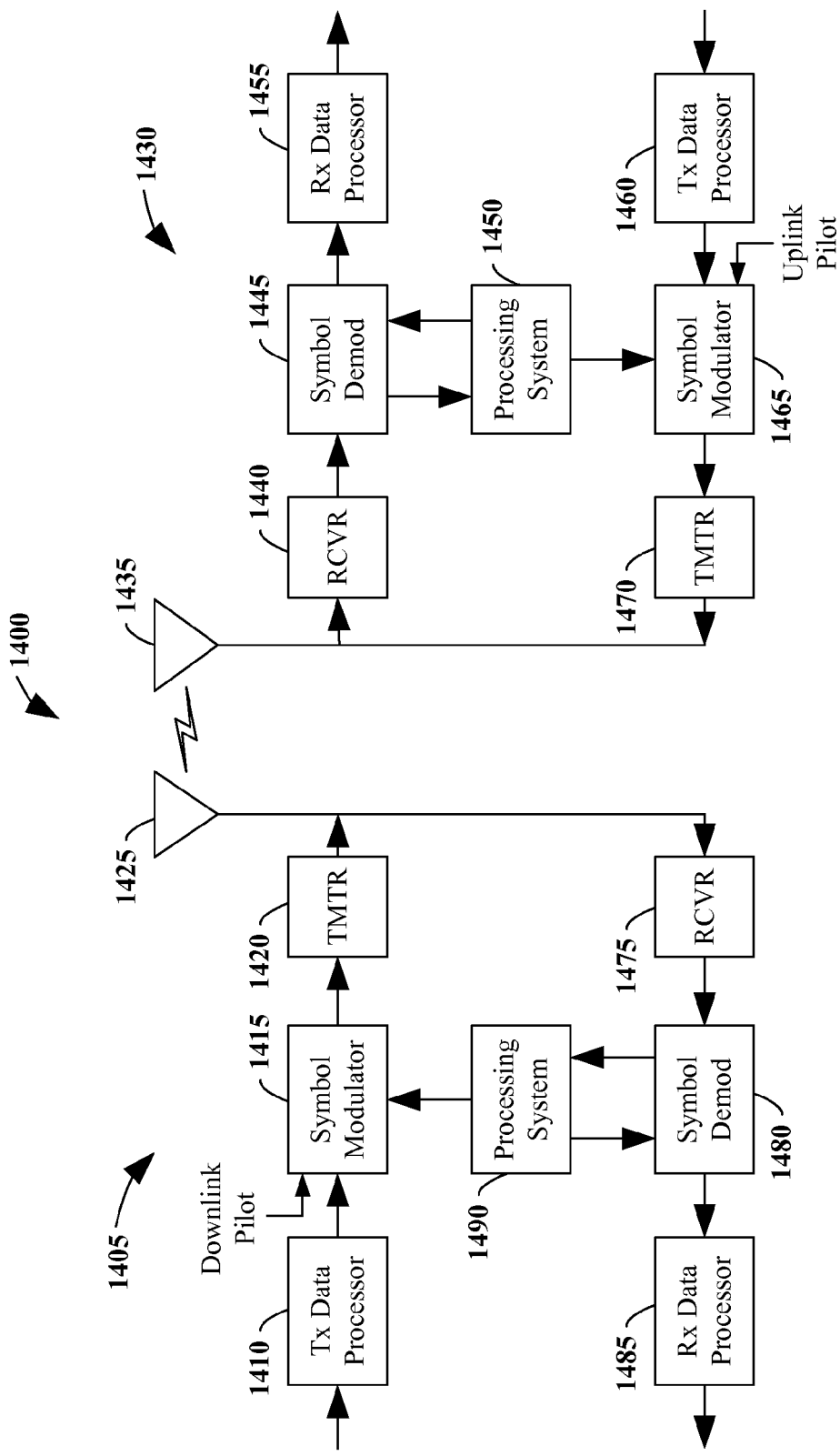
FIG. 14 is an illustration of a wireless network environment that can be employed in conjunction with the various systems and methods described herein.

FIG. 14 shows an exemplary wireless communication system 1400. The wireless communication system 1400 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the methods and/or systems described herein to facilitate wireless communication there between. For example, nodes in the system 1400 (e.g., access point and/or terminal) may store and execute instructions for performing any of the above-described methods (e.g., generating RUMS, responding to RUMs, determining node disadvantage, selecting a number of carriers for RUM transmission, etc.) as well as data associated with performing such actions and any other suitable actions for performing the various protocols described herein.

Referring now to FIG. 14, on a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. Specifically, the symbol modulator 1415 multiplexes data and pilot symbols and provides them to a transmitter unit (TMTR) 1420. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1420 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processing system 1450 for channel estimation. Symbol demodulator 1445 further receives a frequency response estimate for the downlink from processing system 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols to a symbol modulator 1465 that receives and multiplexes the data symbols with pilot symbols, performs modulation, and to create a stream of symbols. A transmitter unit 1470 then receives and processes the stream of symbols to generate an uplink signal, which is transmitted by the antenna 1435 to the access point 1405.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processing system 1490 performs channel estimation for each active terminal transmitting on the uplink. Multiple terminals may transmit pilot concurrently on the uplink on their respective assigned sets of pilot subbands, where the pilot subband sets may be interlaced.

Processing systems 1490 and 1450 direct (e.g., control, coordinate, manage, etc.) operation at access point 1405 and terminal 1430, respectively. Respective processing systems 1490 and 1450 can be associated with memory units (not shown) that store program codes and data. Processing systems 1490 and 1450 can also perform computations to derive frequency and impulse response estimates for the uplink and downlink, respectively. The processing systems 1490 and 1450 may include one or more processors. A processor may be a general purpose microprocessor, a microcontroller, a Digital Signal Processor (DSP), an Application Specific Integrated Circuit (ASIC), a Field Programmable Gate Array (FPGA), digital signal processing devices (DSPDs), a Programmable Logic Device (PLD), logic circuits, discrete hardware components, or any other suitable entity that can perform calculations or other manipulations of information.

The processing system may also include one or more machine-readable media provide data storage, including look up tables for translating identifiers to IP addresses for access terminal applications, and/or to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof.

Figure 15:
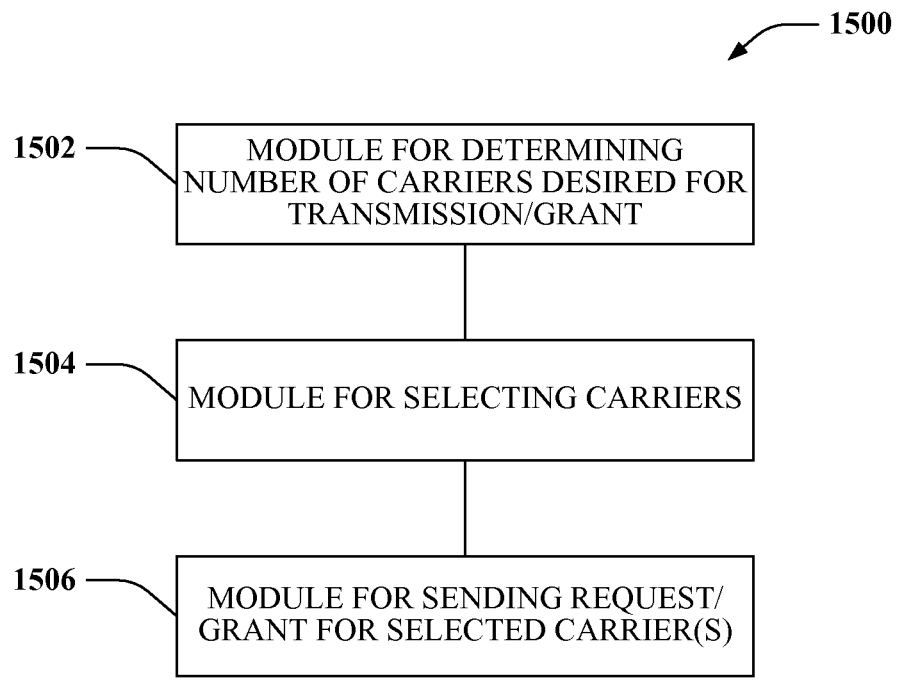
FIG. 15 is an illustration of an apparatus that facilitates wireless data communication, in accordance with various aspects.
Figure 16:
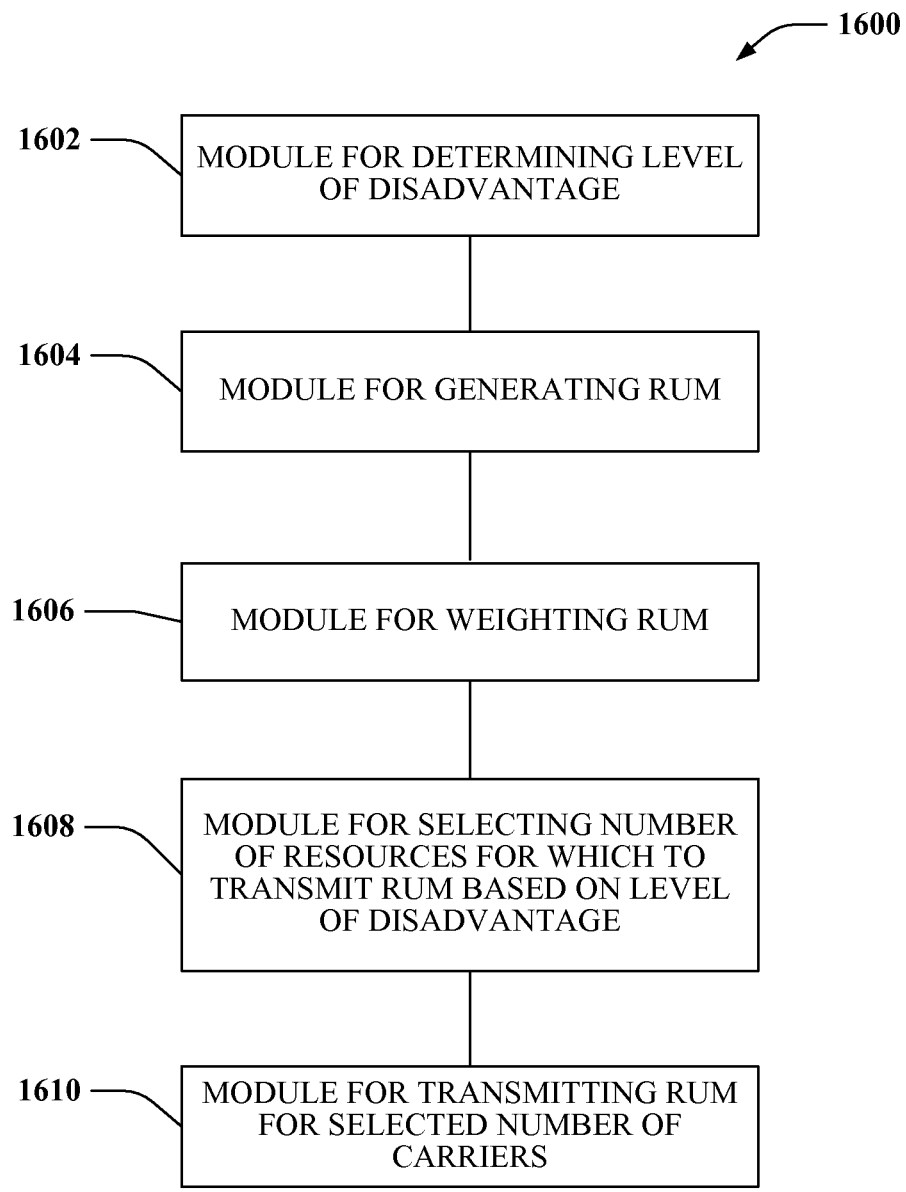
FIG. 16 is an illustration of an apparatus that facilitates wireless communication using RUMs, in accordance with one or more aspects.
Figure 17:
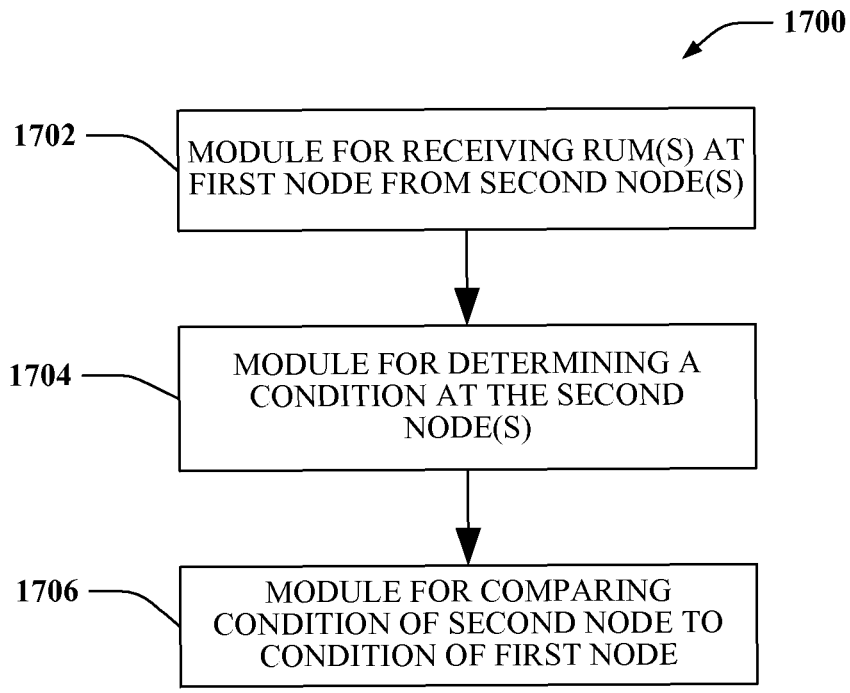
FIG. 17 is an illustration of an apparatus that facilitates comparing relative conditions at nodes in a wireless communication environment to determine which nodes are most disadvantaged, in accordance with one or more aspects.

Now turning to FIGS. 15-17 and to the various modules described with regard thereto, it will be appreciated that a module for transmitting may comprise, for example, a transmitter, and/or may be implemented in a processor, etc. Similarly, a module for receiving may comprise a receiver and/or may be implemented in a processor, etc. Additionally, a module for comparing, determining, calculating, and/or performing other analytical actions, may comprise a processor that executes instructions for performing the various and respective actions.

FIG. 15 is an illustration of a channel selection apparatus 1500 that facilitates wireless data communication, in accordance with various aspects. The channel selection apparatus 1500 is represented as a series of interrelated functional blocks that can represent functions implemented by a processor, software, or combination thereof (e.g., firmware). For example, the channel selection apparatus 1500 may provide modules for performing various acts such as are described above with regard to the various figures. The channel selection apparatus 1500 comprises a module for determining 1502 a number of carriers desired for transmission by a node such as an access terminal. When used for an access point, the module for determining 1502 may also determine a number of carriers to be granted based on the requested desired number of channels. The determination may be performed as a function of a weight associated with a node in which the apparatus is employed, a weight associated with one or more other nodes, a number of carriers available for transmission, etc. Additionally, each weight may be a function of a number of flows supported by the node associated with the weight. Additionally or alternatively, a given weight may be a function of interference experienced by the node.

The channel selection apparatus 1500 additionally comprise a module for selecting 1504 that selects carriers for which the node may transmit a request. The module for selecting 1504 additionally may evaluate a received RUM to determine which carriers are available and which are not. For instance, each RUM may comprise information associated with unavailable carriers, and the module for selecting 1554 may determine that a given carrier that is not indicated by the RUM is available. A module for sending 1506 may transmit a request for at least one carrier selected by the module for selecting 1504. It will be appreciated that the channel selection apparatus 1500 may be employed in an access point or an access terminal, and may comprise any suitable functionality to carry out the various methods described herein.

FIG. 16 is an illustration of an RUM generation apparatus 1600 that facilitates wireless communication using RUMs in accordance with one or more aspects. The RUM generation apparatus 1600 is represented as a series of interrelated functional blocks, which can represent functions implemented by a processor, software, or combination thereof (e.g., firmware). For example, the RUM generation apparatus 1600 may provide modules for performing various acts such as are described above with regard to previous figures. The RUM generation apparatus 1600 comprises a module for determining 1602 that determines a level of disadvantage for a node, and a module for generating an RUM 1604 that generates an RUM if the module for determining 1602 determines that a first predetermined threshold has been exceeded (e.g., a level of received service at a node is at or below a predetermined threshold level). Alternatively, the module for determining 1602 may also or alternatively determine if a level of interference is above a predetermined threshold level before generating the RUM. The predetermined threshold may be associated with and/or represent an IOT, a data rate, a C/I, a level of throughput, a level of spectral efficiency, a level of latency, etc. A module for selecting 1608 may select one or more resources for which to send the RUM, and the module for generating the RUM 1604 may then indicate such carriers in the RUM. A module for transmitting 1610 may then transmit the RUM.

The RUM generation apparatus 1600 may additionally comprise a module for weighting the RUM 1606, which may weight the RUM with a value indicative of a degree to which a second predetermined threshold has been exceeded, which may comprise determining a ration of an actual value of a parameter (e.g., IOT, a data rate, C/I, a level of throughput, a level of spectral efficiency, a level of latency, etc.) achieved at the node to a target, or desired, value. Additionally, the weighted value may be a quantized value.

The module for selecting resources 1608 may adjust a number of selected resources for which a subsequent RUM is transmitted based on a determination by the module for determining 1602 that the level of received service has improved in response to a previous RUM. For instance, in such a scenario, the module for selecting 1608 may reduce a number of resources indicated in a subsequent RUM in response to an improved level of received service at the node, and may increase a number of selected resources in response to a decreased or static level of received service. The resources could involve the number and identity of the carriers that are selected to be included in the RUM (e.g. in the CM of the RUM).

It will be appreciated that the RUM generation apparatus 1600 may be employed in an access point, an access terminal, etc., and may comprise any suitable functionality to carry out the various methods described herein.

FIG. 17 is an illustration of a comparison apparatus 1700 that facilitates comparing relative conditions at nodes in a wireless communication environment to determine which nodes are most disadvantaged, in accordance with one or more aspects. The comparison apparatus 1700 is represented as a series of interrelated functional blocks, which can represent functions implemented by a processor, software, or combination thereof (e.g., firmware). For example, the comparison apparatus 1700 may provide modules for performing various acts such as are described above with regard to various figures. The comparison apparatus 1700 may be employed in a first node and comprises a module for receiving RUMs 1702 that receives RUMs from at least one second node. The comparison apparatus 1700 may additionally comprise a module for determining condition 1704 that determines a condition of the second node based on information associated with an RUM received from the second node, and a module for comparing 1706 that compares a condition of the first node to the determined condition of the second node. The module for determining 1704 may then further determine whether to transmit data over a first carrier based on the comparison.

According to various other aspects, the determination of whether to transmit may be based on whether the first node's condition is better, substantially equal to, or worse than the second node's condition. Additionally, the module for determining 1704 may transmit a data signal over the first carrier, a request-to-send message over the first carrier, or a request-to-send message over a second carrier. In the latter case, the request-to send message sent over the second carrier may comprise a request to transmit data over the first carrier. It will be appreciated that the comparison apparatus 1700 may be employed in an access point or an access terminal, and may comprise any suitable functionality to carry out the various methods described herein.

Figure 18:
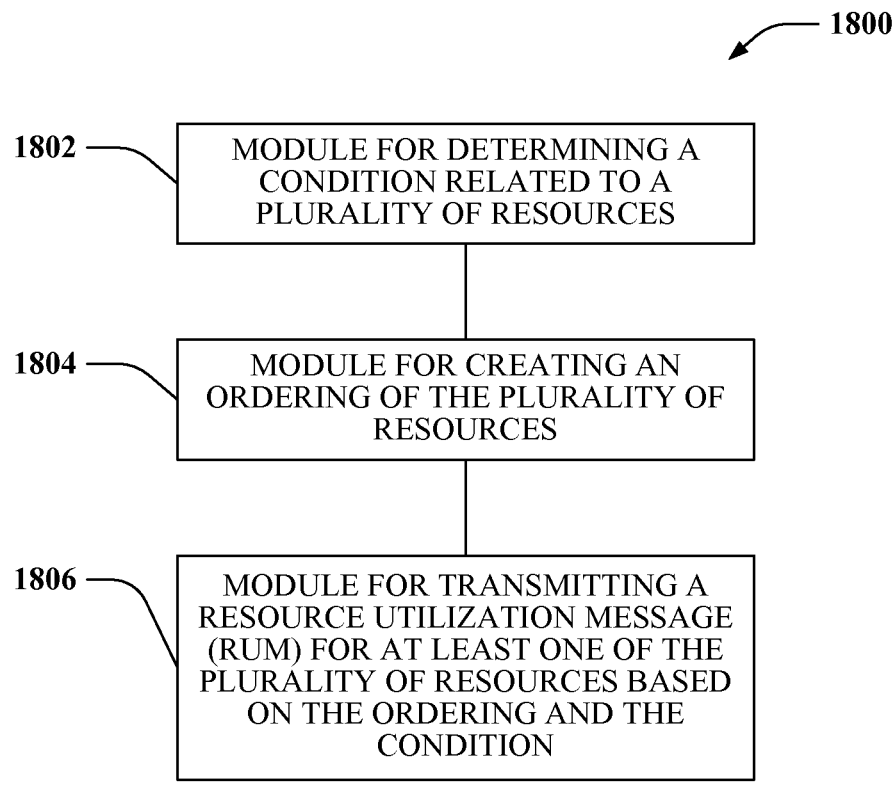
FIG. 18 is an illustration of an apparatus that facilitates reserving resources based on a carrier masking sequence, in accordance with one or more aspects.

FIG. 18 is an illustration of a reservation apparatus 1800 that facilitates reserving resources based on a carrier masking sequence, in accordance with one or more aspects. The reservation apparatus 1800 is represented as a series of interrelated functional blocks, which can represent functions implemented by a processor, software, or combination thereof (e.g., firmware). For example, the reservation apparatus 1800 may provide modules for performing various acts such as are described above with regard to various figures. The reservation apparatus 1800 may be employed in a first node and comprises a module 1802 for determining a condition related to a plurality of resources. The reservation apparatus 1800 may additionally comprise a module 1804 for creating an ordering of the plurality of resources, and a module 1806 for transmitting an RUM for at least one of the plurality of resources based on the ordering and the condition.

Figure 19:
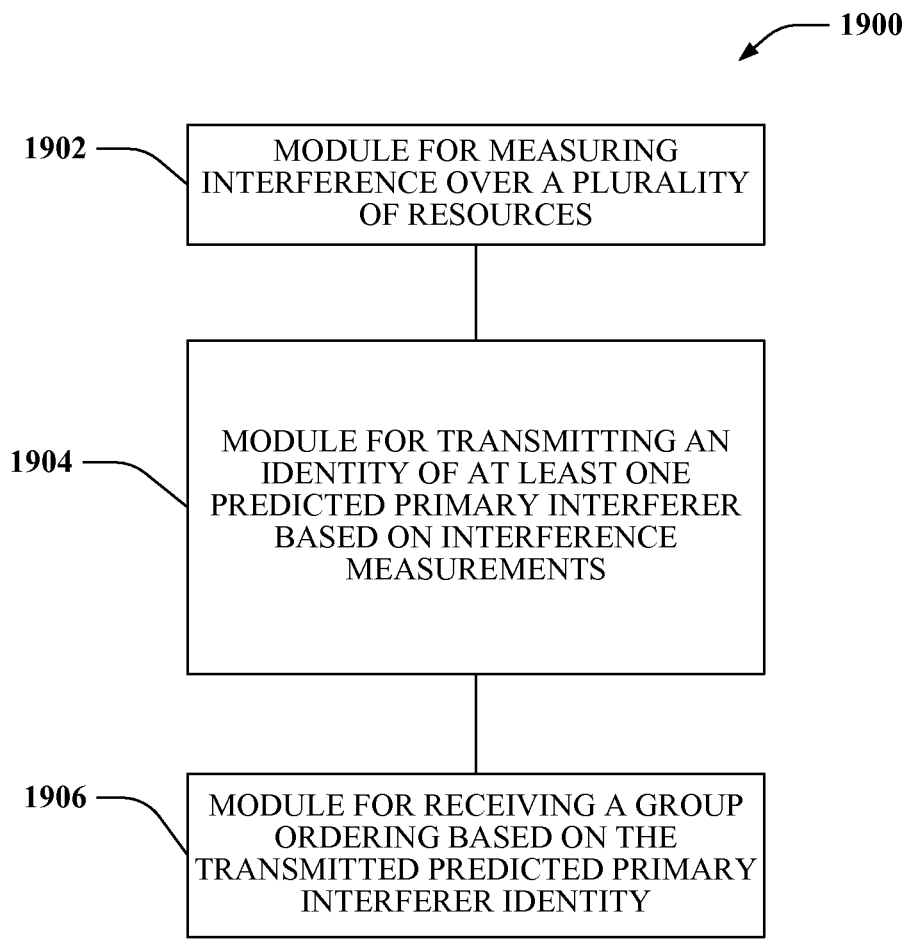
FIG. 19 is an illustration of an apparatus that facilitates managing a subset of a plurality of resources based on a received group carrier mask, in accordance with one or more aspects.

FIG. 19 is an illustration of a resource management apparatus 1900 that facilitates managing resources based on a received group carrier mask, in accordance with one or more aspects. The resource management apparatus 1900 is represented as a series of interrelated functional blocks, which can represent functions implemented by a processor, software, or combination thereof (e.g., firmware). For example, the management apparatus 1900 may provide modules for performing various acts such as are described above with regard to various figures. The resource management apparatus 1900 may be employed in a first node and comprises a module 1902 for measuring interference over a plurality of resources. The resource management apparatus 1900 may additionally comprise a module 1904 for transmitting an identity of at least one predicted primary interferer based on interference measurements, a module 1906 for receiving a group ordering based on the transmitted predicted primary interferer identity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The teachings herein may be incorporated into (e.g., implemented within or performed by) a variety of apparatuses (e.g., devices). For example, each node may be configured, or referred to in the art, as an access point (AP), NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology. Certain nodes also may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The various illustrative logical blocks, modules, and circuits described in connection with the aspects disclosed herein may be implemented within or performed by an integrated circuit (IC), an access terminal, or an access point. The IC may comprise a general purpose processor, a DSP, an ASIC, an FPGA or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

What is claimed is:

1. A method of wireless data communication comprising:
   determining a condition related to a plurality of carriers that are shared by nodes in a communication system;
   creating an ordering of the plurality of resources; and
   transmitting a resource utilization message (RUM) for at least one of the plurality of carriers based on the ordering and the condition, wherein the RUM indicates that one of the nodes desires to block at least one other node from transmitting on the at least one of the plurality of carriers, and wherein the RUM includes a weight that indicates a degree to which the respective node is disadvantaged based on an actual level of performance achieved at the respective node and a target level of performance at the respective node.

2. The method of claim 1, wherein the condition comprises at least one of a level of interference over thermal noise (IOT), a carrier-to-interference ratio (C/I), and a level of spectral efficiency for the plurality of carriers.

3. The method of claim 1, wherein the condition comprises a quality of service (QoS) requirement for the plurality of carriers, wherein the QoS requirement comprises at least one of a data rate, an amount of data to transmit, a level of latency, and a traffic class.

4. The method of claim 1, wherein the determination comprises:
receiving a signal, and
deriving the condition from the signal.

5. The method of claim 4, wherein the signal comprises an indication of a preferred ordering of the plurality of carriers.

6. The method of claim 4, wherein the signal comprises an indication of at least one of a level of interference over thermal noise (IOT), a carrier-to-interference ratio (C/I), a level of spectral efficiency, and one or more received RUMs for the plurality of carriers determined at an associated node.

7. The method of claim 1, wherein the ordering satisfies a predetermined partitioning scheme.

8. The method of claim 7, wherein the predetermined partitioning scheme specifies a predetermined set of carriers for which to transmit an RUM according to a type of traffic.

9. The method of claim 1, wherein the ordering is based on a pseudo-random sequence.

10. The method of claim 1, wherein the ordering is based on a result of previous RUMs transmitted for the plurality of carriers.

11. The method of claim 10, wherein the result of previous RUMs transmitted comprises at least one of a number of successful transmissions, a number of unsuccessful transmissions, a number of previously transmitted RUMs, and a number of RUMs previously transmitted for the plurality of carriers by other nodes.

12. The method of claim 1, wherein the weight is based on an actual throughput achieved at the respective node and a target throughput at the respective node.

13. The method of claim 1, wherein the weight is based on a ratio of the actual level of performance achieved at the respective node and the target level of performance at the respective node.

14. An apparatus for wireless data communication comprising:
means for determining a condition related to a plurality of carriers that are shared by the apparatus and nodes in a communication system;
means for creating an ordering of the plurality of carriers; and
means for transmitting a resource utilization message (RUM) for at least one of the plurality of carriers based on the ordering and the condition,
wherein the RUM indicates that the apparatus desires to block at least one of the nodes from transmitting on the at least one of the plurality of carriers, and
wherein the RUM includes a weight that indicates a degree to which the apparatus is disadvantaged based on an actual level of performance achieved at the apparatus and a target level of performance at the apparatus.

15. The apparatus of claim 14, wherein the condition comprises at least one of a level of interference over thermal noise (IOT), a carrier-to-interference ratio (C/I), and a level of spectral efficiency for the plurality of carriers.

16. The apparatus of claim 14, wherein the condition comprises a quality of service (QoS) requirement for the plurality of carriers, wherein the QoS requirement comprises at least one of a data rate, an amount of data to transmit, a level of latency, and a traffic class.

17. The apparatus of claim 14, wherein the determination means comprises:
means for receiving a signal, and
means for deriving the condition from the signal.

18. The apparatus of claim 17, wherein the signal comprises an indication of a preferred ordering of the plurality of carriers.

19. The apparatus of claim 17, wherein the signal comprises an indication of at least one of a level of interference over thermal noise (IOT), a carrier-to-interference ratio (C/I), a level of spectral efficiency, and one or more received RUMs for the plurality of carriers determined at an associated node.

20. The apparatus of claim 14, wherein the ordering satisfies a predetermined partitioning scheme.

21. The apparatus of claim 20, wherein the predetermined partitioning scheme specifies a predetermined set of carriers for which to transmit an RUM according to a type of traffic.

22. The apparatus of claim 14, wherein the ordering is based on a pseudo-random sequence.

23. The apparatus of claim 14, wherein the ordering is based on a result of previous RUMs transmitted for the plurality of carriers.

24. The apparatus of claim 23, wherein the result of previous RUMs transmitted comprises at least one of a number of successful transmissions, a number of unsuccessful transmissions, a number of previously transmitted RUMs, and a number of RUMs previously transmitted for the plurality of carriers by other nodes.

25. An access point comprising:
an antenna: and,
a processing system coupled to the antenna and configured to:
determine a condition related to a plurality of carriers via the antenna, wherein the carriers are shared by the access point and nodes in a communication system;
create an ordering of the plurality of carriers; and
transmit a resource utilization message (RUM) for at least one of the plurality of carriers based on the ordering and the condition,
wherein the RUM indicates that the access point desires to block at least one of the nodes from transmitting on the at least one of the plurality of carriers, and
wherein the RUM includes a weight that indicates a degree to which the access point is disadvantaged based on an actual level of performance achieved at the access point and a target level of performance at the access point.

26. An access terminal comprising:
a transducer; and,
a processing system coupled to the transducer and configured to:
determine a condition related to a plurality of carriers usable to communicate data with the transducer, wherein the carriers are shared by the access terminal and nodes in a communication system;

create an ordering of the plurality of carriers; and
transmit a resource utilization message (RUM) for at least one of the plurality of carriers based on the ordering and the condition,
wherein the RUM indicates that the access terminal desires to block at least one of the nodes from transmitting on the at least one of the plurality of carriers, and
wherein the RUM includes a weight that indicates a degree to which the access terminal is disadvantaged based on an actual level of performance achieved at the access terminal and a target level of performance at the access terminal.

27. A computer program product for wireless data communication comprising:
a non-transitory computer readable storage medium comprising codes executable to:
determine a condition related to a plurality of carriers that are shared by nodes in a communication system;
create an ordering of the plurality of carriers; and
transmit a resource utilization message (RUM) for at least one of the plurality of carriers based on the ordering and the condition,
wherein the RUM indicates that one of the nodes desires to block at least one other node from transmitting on the at least one of the plurality of carriers, and
wherein the RUM includes a weight that indicates a degree to which the respective node is disadvantaged based on an actual level of performance at the respective node and a target level of performance at the respective node.

28. An apparatus for wireless data communication comprising:
a processing system configured to:
determine a condition related to a plurality of carriers that are shared by the apparatus and nodes in a communication system;
create an ordering of the plurality of carriers; and
transmit a resource utilization message (RUM) for at least one of the plurality of carriers based on the ordering and the condition,
wherein the RUM indicates that the apparatus desires to block at least one of the nodes from transmitting on the at least one of the plurality of carriers, and
wherein the RUM includes a weight that indicates a degree to which the apparatus is disadvantaged based on an actual level of performance achieved at the apparatus and a target level of performance at the apparatus.

29. The apparatus of claim 28, wherein the condition comprises at least one of a level of interference over thermal noise (IOT), a carrier-to-interference ratio (C/I), and a level of spectral efficiency for the plurality of carriers.

30. The apparatus of claim 28, wherein the condition comprises a quality of service (QoS) requirement for the plurality of carriers, wherein the QoS requirement comprises at least one of a data rate, an amount of data to transmit, a level of latency, and a traffic class.

31. The apparatus of claim 28, wherein the processing system is further configured to:
receive a signal, and
derive the condition from the signal.

32. The apparatus of claim 31, wherein the signal comprises an indication of a preferred ordering of the plurality of carriers.

33. The apparatus of claim 31, wherein the signal comprises an indication of at least one of a level of interference over thermal noise (IOT), a carrier-to-interference ratio (C/I), a level of spectral efficiency, and one or more received RUMs for the plurality of carriers determined at an associated node.

34. The apparatus of claim 28, wherein the ordering satisfies a predetermined partitioning scheme.

35. The apparatus of claim 34, wherein the predetermined partitioning scheme specifies a predetermined set of carriers for which to transmit an RUM according to a type of traffic.

36. The apparatus of claim 28, wherein the ordering is based on a pseudo-random sequence.

37. The apparatus of claim 28, wherein the ordering is based on a result of previous RUMs transmitted for the plurality of carriers.

38. The apparatus of claim 37, wherein the result of previous RUMs transmitted comprises at least one of a number of successful transmissions, a number of unsuccessful transmissions, a number of previously transmitted RUMs, and a number of RUMs previously transmitted for the plurality of carriers by other nodes.

* * * * *